United States Patent
Ueno et al.

(10) Patent No.: US 9,097,966 B2
(45) Date of Patent: Aug. 4, 2015

(54) MOBILE ELECTRONIC DEVICE FOR PROJECTING AN IMAGE

(75) Inventors: Yasuhiro Ueno, Yokohama (JP); Shigeki Tanabe, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 133 days.

(21) Appl. No.: 13/989,710

(22) PCT Filed: Nov. 18, 2011

(86) PCT No.: PCT/JP2011/076703
§ 371 (c)(1),
(2), (4) Date: May 24, 2013

(87) PCT Pub. No.: WO2012/070503
PCT Pub. Date: May 31, 2012

(65) Prior Publication Data
US 2013/0244733 A1    Sep. 19, 2013

(30) Foreign Application Priority Data

Nov. 26, 2010  (JP) .................................. 2010-264385
Nov. 26, 2010  (JP) .................................. 2010-264386

(51) Int. Cl.
| | |
|---|---|
| *G03B 21/14* | (2006.01) |
| *H04M 1/02* | (2006.01) |
| *H04N 9/31* | (2006.01) |

(52) U.S. Cl.
CPC .............. *G03B 21/14* (2013.01); *H04M 1/0214* (2013.01); *H04N 9/3173* (2013.01); *H04N 9/3185* (2013.01); *H04N 9/3194* (2013.01); *H04M 1/0272* (2013.01); *H04M 2250/16* (2013.01)

(58) Field of Classification Search
USPC .................................... 455/414.1, 556.1, 566
See application file for complete search history.

(56) References Cited

U.S. PATENT DOCUMENTS

| 8,427,511 B2 * | 4/2013 | Shin et al. ...................... 345/661 |
| 8,744,521 B2 * | 6/2014 | Kim et al. .................. 455/556.1 |
| 2010/0060475 A1 * | 3/2010 | Choi ............................... 340/689 |
| 2010/0105428 A1 * | 4/2010 | Kim .......................... 455/556.1 |
| 2010/0137026 A1 * | 6/2010 | Kim et al. .................. 455/556.1 |

(Continued)

FOREIGN PATENT DOCUMENTS

| JP | 2007-096542 A | 4/2007 |
| JP | 2008-098828 A | 4/2008 |

(Continued)

OTHER PUBLICATIONS

International Search Report and Written Opinion corresponding to PCT/JP2011/076703, dated Jan. 31, 2012.

*Primary Examiner* — Blane J Jackson

(74) *Attorney, Agent, or Firm* — Lowe Hauptman & Ham, LLP

(57) ABSTRACT

According to an aspect, a mobile electronic device 1 includes a projector for projecting an image, a display unit for displaying an image, a detector for detecting an operation, and a processing unit. The processing unit causes the projector to project a first image and causes the display unit to display a second image associated with the first image. While allowing either one of the projector and the display unit to perform the projecting or the displaying, the processing unit causes the other one of them to perform projection or display according to detection of a predetermined operation by the detector.

4 Claims, 16 Drawing Sheets

(56) References Cited

U.S. PATENT DOCUMENTS

| | | | |
|---|---|---|---|
| 2010/0190524 A1* | 7/2010 | Morozumi | 455/556.1 |
| 2011/0119623 A1* | 5/2011 | Kim | 715/808 |
| 2011/0134300 A1* | 6/2011 | Chung | 348/333.01 |
| 2012/0214546 A1* | 8/2012 | Osaka | 455/556.1 |

FOREIGN PATENT DOCUMENTS

| | | |
|---|---|---|
| JP | 2009-251452 A | 10/2009 |
| JP | 2010-028412 A | 2/2010 |
| JP | 2010-170048 A | 8/2010 |

* cited by examiner

MOBILE ELECTRONIC DEVICE FOR PROJECTING AN IMAGE

CROSS-REFERENCE TO RELATED APPLICATION

This application is a National Stage of PCT international application Ser. No. PCT/JP2011/076703 filed on Nov. 18, 2011 which designates the United States, and which is based upon and claims the benefit of priority from Japanese Patent Application No. 2010-264385 and Japanese Patent Application No. 2010-264386, filed on Nov. 26, 2010.

FIELD

The present disclosure relates to a mobile electronic device with an image projection unit for projecting an image.

BACKGROUND

Conventionally, a device for projecting an image to a wall surface or a screen includes a so-called projector. A mainstream of the projector is a so-called stationary type device which is supplied with power from a commercial power supply and is used in a state of being fixed at a predetermined position. The stationary type projector projects an image to a given portion of the wall surface or to the screen in its fixed state.

Recently, on the other hand, a mobile projector compact in size and easy to carry is proposed as the projector. For example, Patent Literature 1 describes a mobile terminal with a projector function that includes an upper cabinet, a lower cabinet, and a hinge for mutually pivotally connecting the upper cabinet and the lower cabinet, and also includes a projector having a lens and a light source.

CITATION LIST

Patent Literature

Patent Literature 1: JP-A-2007-96542

Technical Problem

Incidentally, an image projected by a mobile projector has a comparatively low resolution. Therefore, when an image is projected by the mobile projector, a user sometimes cannot recognize detailed information such as characters in the image, and this may cause the user not to obtain information required for the user.

For the foregoing reasons, there is a need for a mobile electronic device allowing the user to easily use information related to a projected image.

SUMMARY

According to an aspect, a mobile electronic device includes: a projection unit for projecting an image; a display unit for displaying an image; a detecting unit for detecting an operation; and a processing unit. The processing unit causes the projection unit to project a first image, causes the display unit to display a second image associated with the first image, and causes, while allowing either one of the projection unit and the display unit to perform the projecting or the displaying, the other one of them to perform either one of projection and display according to detection of a predetermined operation by the detecting unit.

Advantageous Effects of Invention

One aspect of the present invention has advantageous effects that information related to a projected image is easily used by the user.

DESCRIPTION OF EMBODIMENTS

Exemplary embodiments of the present invention will be explained in detail below with reference to the accompanying drawings. It should be noted that the present invention is not limited by the following explanation. In addition, the components in the explanation below include those which are easily thought of by persons skilled in the art, those which are substantially identical, and those in a scope of so-called equivalents. In the following, a mobile phone is used to explain as an example of the mobile electronic device; however, a target to which the present invention is applied is not limited to the mobile phone. Therefore, the present invention is also applicable to, for example, PHSs (Personal Handyphone Systems), PDAs, portable navigation devices, notebook computers, gaming devices, etc.

Figure 1:
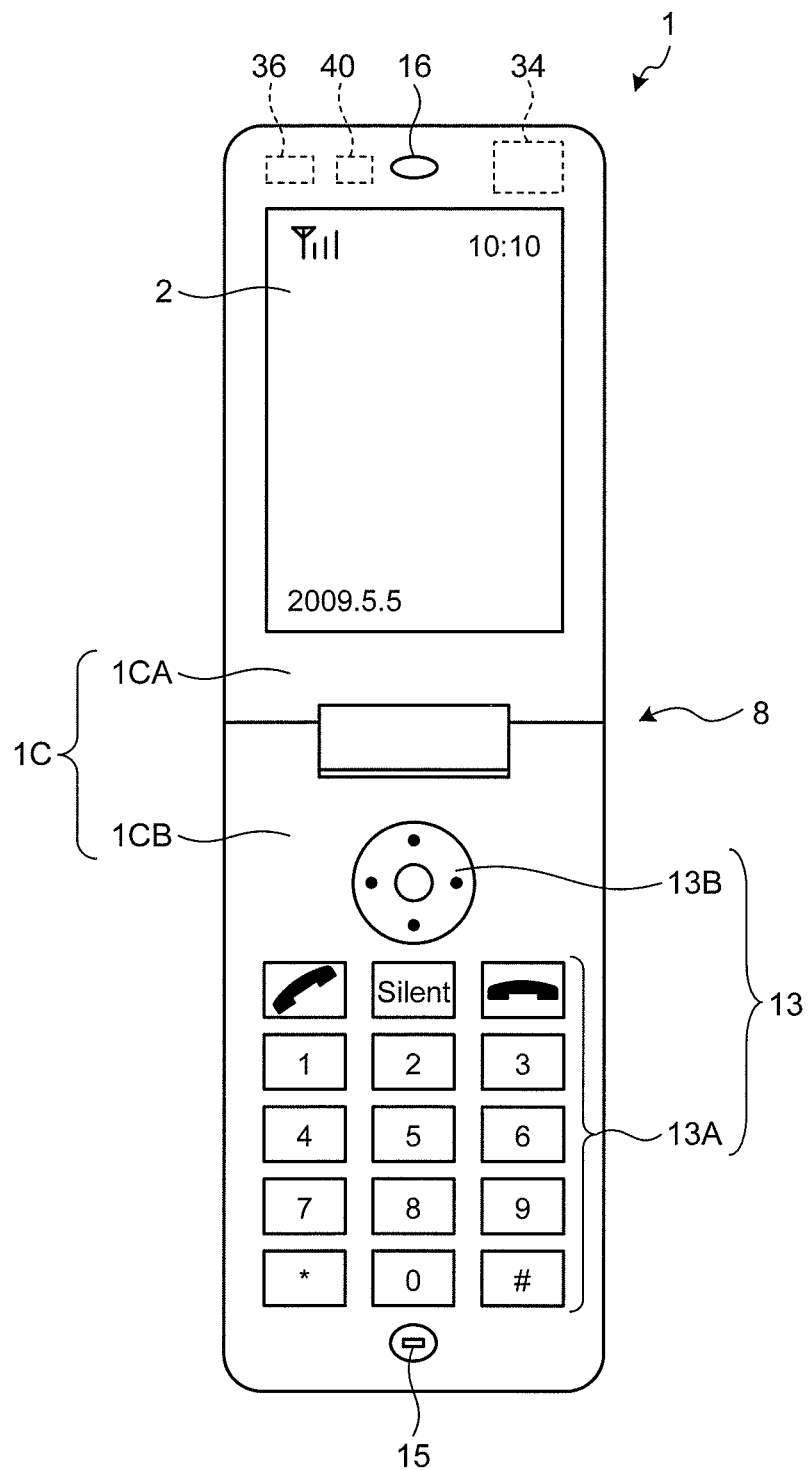
FIG. 1 is a front view illustrating a schematic configuration of a mobile electronic device according to a first embodiment.
Figure 2:
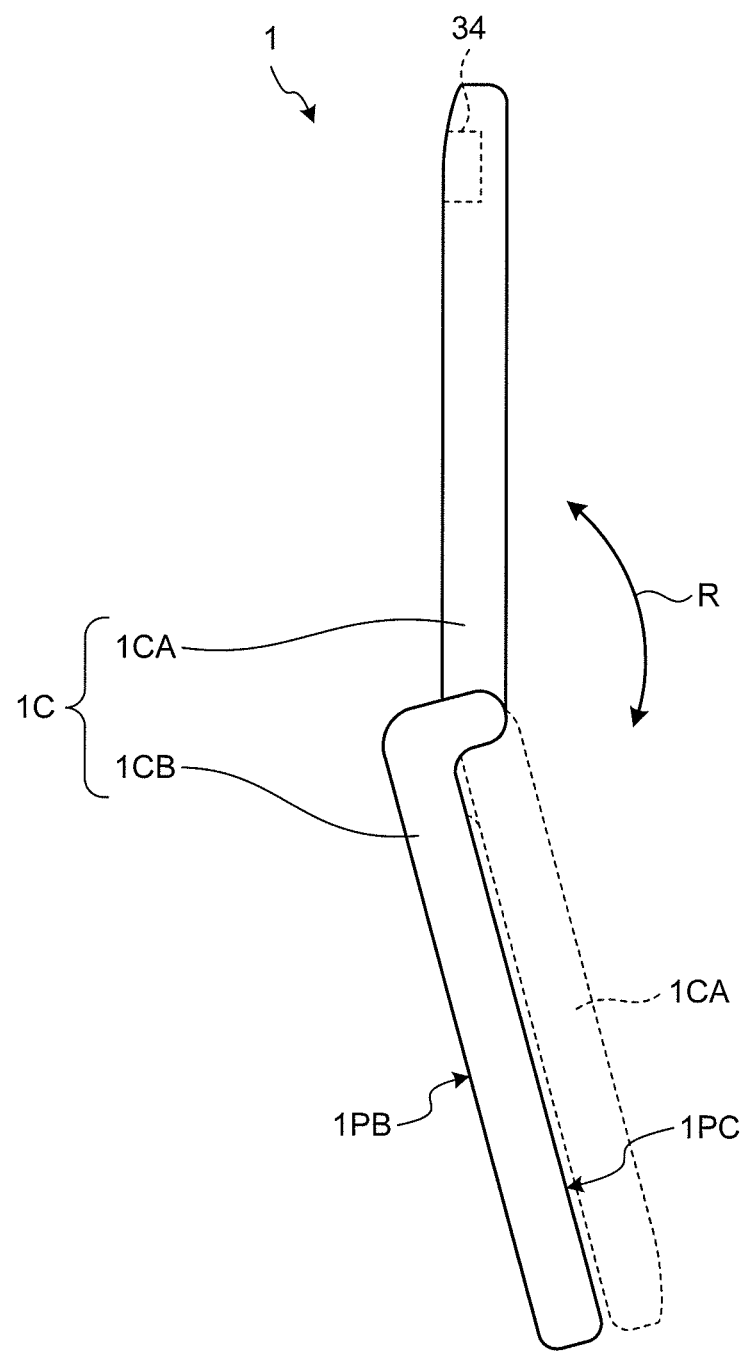
FIG. 2 is a side view of the mobile electronic device illustrated in FIG. 1.

FIG. 1 is a front view illustrating a schematic configuration of a mobile electronic device according to a first embodiment, and FIG. 2 is a side view of the mobile electronic device illustrated in FIG. 1. A mobile electronic device 1 illustrated in FIG. 1 and FIG. 2 is a mobile phone that includes a wireless communication function, an output unit, a sound acquiring unit, and an imaging unit. The mobile electronic device 1 includes a housing 1C having a plurality of housings. Specifically, the housing 1C includes a first housing 1CA and a second housing 1CB which are openable and closable. In other words, the mobile electronic device 1 has a foldable housing. However, the housing of the mobile electronic device 1 is not limited to this configuration. For example, the housing of the mobile electronic device 1 may be a slidable housing with two housings in which one housing and the other housing can mutually slide each other from a state in which both the housings are overlapped, a rotating housing in which one of housings is made to rotate around an axis line along an overlapping direction, or a housing in which two housings are coupled to each other via a two-axis hinge.

The first housing 1CA and the second housing 1CB are coupled to each other by a hinge mechanism 8 being a connection. By coupling the first housing 1CA and the second housing 1CB with the hinge mechanism 8, both the first housing 1CA and the second housing 1CB can pivot around the hinge mechanism 8 so as to pivot in a direction farther away from each other and in a direction closer to each other (directions indicated by arrow R in FIG. 2). When the first housing 1CA and the second housing 1CB pivot in the direction farther away from each other, the mobile electronic device 1 opens, while when the first housing 1CA and the second housing 1CB pivot in the direction closer to each other, the mobile electronic device 1 closes, to become a folded state (state indicated by dotted line in FIG. 2).

The first housing 1CA includes a display 2 illustrated in FIG. 1 as a display unit. The display 2 displays an idle image when the mobile electronic device 1 awaits reception, and displays a menu image used to assist the operations of the mobile electronic device 1. The first housing 1CA also includes a receiver 16 being an output unit that outputs a sound during a phone call on the mobile electronic device 1.

Provided on a side of the first housing 1CA opposite to the side with the display 2 are a projector 34 being an image projection unit, a distance sensor 36 being a distance measuring unit for measuring a distance from a light emitting portion (objective lens) of the projector 34 to an image projection object, and a camera 40 for imaging (capturing) an image of a plane where the image is projected. This configuration enables the projector 34 to project an image to a projection object, and enables the distance sensor 36 to measure a distance between the light emitting surface of the projector 34 and the projection object and to automatically adjusting the focus of the image projected by the projector 34. The light emitting portion of the projector 34 and an imaging window of the camera 40 are exposed to the outside of the first housing 1CA.

The second housing 1CB includes a plurality of operation keys 13A used to input a telephone number of a call partner and a text when a mail is composed, and includes direction and decision keys 13B so as to easily perform selection and decision of a menu appearing on the display 2 and perform scrolling of a screen, and so on. The operation keys 13A and the direction and decision keys 13B constitute an operating unit 13 of the mobile electronic device 1. The second housing 1CB includes a microphone 15 being a sound acquiring unit that receives a sound during a phone call on the mobile electronic device 1. The operating unit 13 is provided on an operating surface 1PC of the second housing 1CB as illustrated in FIG. 2. The side opposite to the operating surface 1PC is a back side 1PB of the mobile electronic device 1.

Figure 3:
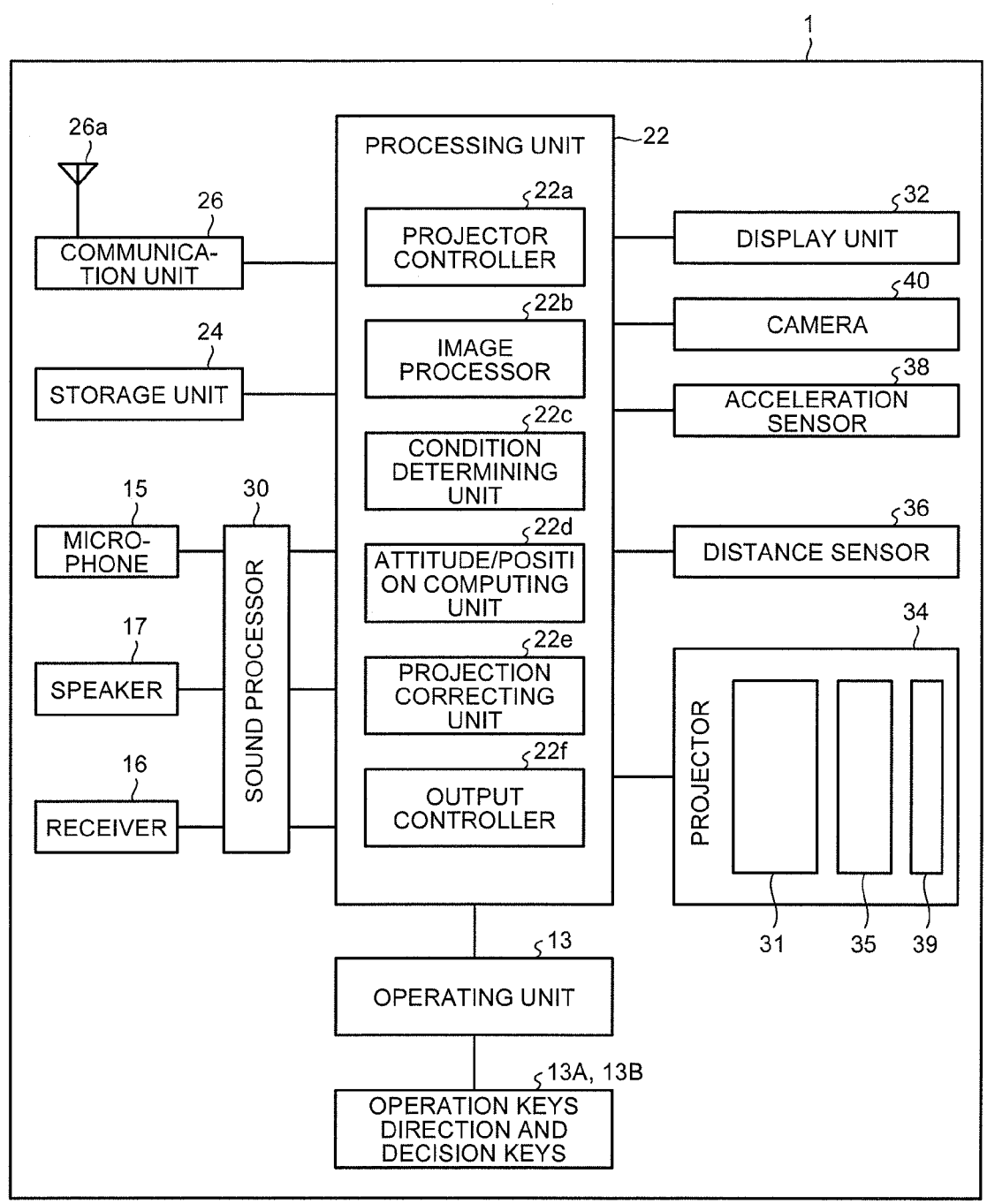
FIG. 3 is a block diagram illustrating the schematic configuration of the mobile electronic device illustrated in FIG. 1 and FIG. 2.

FIG. 3 is a block diagram illustrating the schematic configuration of the mobile electronic device illustrated in FIG. 1 and FIG. 2. As illustrated in FIG. 3, the mobile electronic device 1 includes a processing unit 22, a storage unit 24, a communication unit 26, the operating unit 13, a sound processor 30, a display unit 32, the projector 34, the distance sensor 36, an acceleration sensor 38 being a move detector, and the camera 40. The processing unit 22 includes a function of integrally controlling the overall operation of the mobile electronic device 1. That is, the processing unit 22 controls the operations of the communication unit 26, the sound processor 30, the display unit 32, and the like so that various processes of the mobile electronic device 1 are executed in an appropriate procedure according to an operation through the operating unit 13 and software stored in the storage unit 24 of the mobile electronic device 1.

The various processes of the mobile electronic device 1 are, for example, voice phone conversation over a line switching network, composition and transmission and reception of e-mails, and browsing of Web (World Wide Web) sites on the Internet. The operations of the communication unit 26, the sound processor 30, and the display unit 32 and so on are, for example, signal transmission and reception by the communication unit 26, sound input and output by the sound processor 30, and image display by the display unit 32.

The processing unit 22 executes processes based on programs (for example, operating system programs and application programs) stored in the storage unit 24. The processing unit 22 includes, for example, MPU (Micro Processing Unit), and executes the various processes of the mobile electronic device 1 according to the procedure instructed by the software. That is, the processing unit 22 sequentially reads operation codes from the operating system programs, the application programs, or the like stored in the storage unit 24 to perform the processes.

The processing unit 22 has a function of executing a plurality of application programs. The application program executed by the processing unit 22 includes a plurality of application programs such as an application program for controlling the drive of the projector 34 and the distance sensor 36, an application program for reading various image files (image information) from the storage unit 24 and decoding them, and an application program for causing the display unit 32 to display an image obtained by the decoding and for causing the projector 34 to project the image.

In the present embodiment, the processing unit 22 includes a projector controller 22a, an image processor 22b, a condition determining unit 22c, an attitude/position computing unit 22d, a projection correcting unit 22e, and an output controller 22f.

The projector controller 22a controls the projector 34 to project an image to the image projection object. The image processor 22b decodes the data stored in the storage unit 24 and the data received by the communication unit 26 to generate an image to be projected by the projector 34 and an image to be displayed on the display unit 32. The image processor 22b also generates an image to be displayed or to be projected as various screens for providing information to the user and accepting an input of information from the user. The image processor 22b executes a process for processing the image such as enlargement, reduction, and modification.

The condition determining unit 22c determines whether a condition affecting projection of an image by the projector controller 22a has been changed. The condition affecting projection of an image by the projector controller 22a is, for example, a change of an attitude of the mobile electronic device 1 and a change of a distance to the image projection object. The attitude/position computing unit 22d calculates an attitude and a position of the mobile electronic device 1 based on the detection results or the like of the distance sensor 36 and the acceleration sensor 38.

The projection correcting unit 22e performs a correction process so as to project an image in a given size to a given position of the image projection object. Specifically, the projection correcting unit 22e changes the content of the control of the projector 34 by the projector controller 22a and the content of the image processing by the image processor 22b according to changes of the attitude and the position of the mobile electronic device 1 calculated by the attitude/position computing unit 22d to thereby maintain the position and the size of a projection image constant.

The output controller 22f projects a first image from the projector 34 and displays a second image associated with the first image on the display unit 32. The output controller 22f changes the second image according to the change of the attitude and the position of the mobile electronic device 1 calculated by the attitude/position computing unit 22d while projecting the first image with no change.

The associated images include, for example, images representing an identical scene, object, information, or the like, and images having a spatial, temporal, or semantic connection (continuity). The way to change the second image differs according to the types of images, for example, processes such as enlargement, reduction, slide (change of a display area), change of a display mode of included elements, and addition of information are performed on the second image.

The functions provided in the projector controller 22a, the image processor 22b, the condition determining unit 22c, the attitude/position computing unit 22d, the projection correcting unit 22e, and the output controller 22f are implemented by hardware resources including the processing unit 22 and the storage unit 24 that perform each task assigned by a control unit of the processing unit 22. The task mentioned here represents whole processes performed by an application software or a unit of a process that cannot be simultaneously executed, of processes performed by the same application software.

The storage unit 24 stores therein software and data used for processes executed by the processing unit 22, and stores therein a task for activating an application program for controlling the drive of the projector 34 and the distance sensor 36, and a task for activating an image processing program. The storage unit 24 stores therein, in addition to the tasks, for example, sound data through communications or downloaded, software used by the processing unit 22 to provide control for the storage unit 24, an address book in which telephone numbers and mail addresses of the other parties, and the like are set for management, a sound file such as a dial tone and a ring tone, and temporary data used in the processing process of the software.

The computer program and the temporary data used in the processing process of the software are temporarily stored in a work area assigned to the storage unit 24 by the processing unit 22. The storage unit 24 includes, for example, nonvolatile storage devices (nonvolatile semiconductor memory such as ROM: Read Only Memory, a hard disk drive etc.) and a readable/writable storage device (e.g., SRAM: Static Random Access Memory, and DRAM: Dynamic Random Access Memory).

The communication unit 26 includes an antenna 26a, and establishes a wireless signal path using CDMA (Code Division Multiple Access) system or so with a base station via a channel assigned by the base station and performs telephone communication and information communication with the base station. The operating unit 13 includes the operation keys 13A and the direction and decision keys 13B assigned with various functions, for example, a power key, a talk key, numeric keys, character keys, direction keys, a decision key, and a send key. When any of the keys is input through a user operation, the key generates a signal corresponding to the user operation. The generated signal is input to the processing unit 22 as an instruction of the user.

The sound processor 30 performs a process on a sound signal input to the microphone 15 and on a sound signal output from the receiver 16 and a speaker 17. That is, the sound processor 30 amplifies the sound input through the microphone 15, performs AD conversion (Analog-to-Digital conversion) on the sound, and thereafter further performs signal processing such as encoding on the sound, converts the sound to digital sound data, and outputs the converted sound data to the processing unit 22. The sound processor 30 performs processes such as decoding, DA conversion (Digital-to-Analog conversion), and amplification on the sound data sent from the processing unit 22, converts the sound signal to an analog sound signal, and then outputs the converted sound signal to the receiver 16 and the speaker 17. The speaker 17 is disposed in the housing 1C of the mobile electronic device 1, and outputs a ring tone, a send tone of mail, or the like.

The acceleration sensor 38 detects a direction and a magnitude of acceleration applied to the mobile electronic device 1. The detection result of the acceleration sensor 38 is used to determine whether there is a change of the attitude of the mobile electronic device 1 or the presence or absence of its movement, or to calculate an amount of change of the attitude and a movement distance. A direction sensor may be provided in the mobile electronic device 1 in order to determine whether there is a change of the attitude of the mobile electronic device 1, and to calculate an amount of change of the attitude.

The display unit 32 includes the display 2, and displays a video according to video data and an image according to image data supplied from the processing unit 22 on a display panel. The display 2 includes a display panel formed from, for example, LCD (Liquid Crystal Display), an OEL (Organic Electro-Luminescence) panel, etc. The display unit 32 may include a sub-display in addition to the display 2.

The projector 34 includes a light source and an optical system for switching whether to project or not to project light emitted from the light source based on the image data. In the present invention, the projector 34 includes a visible-light irradiation device (visible-light irradiating unit) 31 being the light source, a drawing device 35 being the optical system, and a focus adjustment device 39. The visible-light irradiation device 31 irradiates visible laser light. The light in a visible light region is a light whose short wavelength side ranges from 360 nm to 400 nm and whose long wavelength side ranges from 760 nm to 830 nm. In the present embodiment, the visible-light irradiation device 31 irradiates lights in three colors, R (Red), G (Green), and B (Blue).

The drawing device 35 synthesizes the lights in three colors irradiated from the visible-light irradiation device 31, and irradiates the synthesized lights to the image projection object. The drawing device 35 includes a switching element for switching whether to pass or not to pass the light emitted from the light source therethrough, and a mirror for causing the light having passed through the switching element to perform raster scan. The drawing device 35 changes an angle of the laser light emitted from the visible-light irradiation device 31 by the mirror and scans the laser light on the image projection object, to thereby project the image to the image projection object.

As the mirror, for example, an MEMS (Micro Electro Mechanical System) mirror is used. The MEMS mirror uses a piezoelectric element to drive the mirror and scans the visible light irradiated from the visible-light irradiation device 31 to thereby generate a visible image or an invisible image. In this case, the mirror is used to change an angle of the light irradiated from the light source and to scan the light irradiated from the light source over the whole surface of the image projection object, so that the visible image or the invisible image can be projected to the image projection object. As explained above, the projector 34 is a scan type projector. The configuration of the projector 34 is not limited to the projector that uses the laser as a light source. For example, the projector 34 may be a projector that uses a halogen light, an LED light source, or an LD light source as a light source and includes an LCD or a DMD (Digital Micro-mirror Device) provided in the optical system.

The focus adjustment device 39 has a function (focus adjustment function) of forming a visible image projected from the drawing device 35 on the image projection object by an instruction sent from the projector controller 22a. The focus adjustment device 39 includes, for example, a focus adjustment mechanism formed from a movable lens and so on, and moves the lens to implement the focus adjustment function. Alternatively, the focus adjustment device 39 may implement the focus adjustment function by causing the image processor 22b to perform predetermined image processing on the image data to be projected by the projector 34. Furthermore, the focus adjustment device 39 may implement the focus adjustment function by the focus adjustment mechanism and the image processing. The distance sensor 36 measures a distance between the light emitting portion of the projector 34 and the image projection object. Instead of the distance sensor 36, the function of adjusting a focus of the image projected from the projector 34 in the focus adjustment device 39 may be used to measure a distance between the light emitting portion of the projector 34 and the image projection object.

Figure 4:
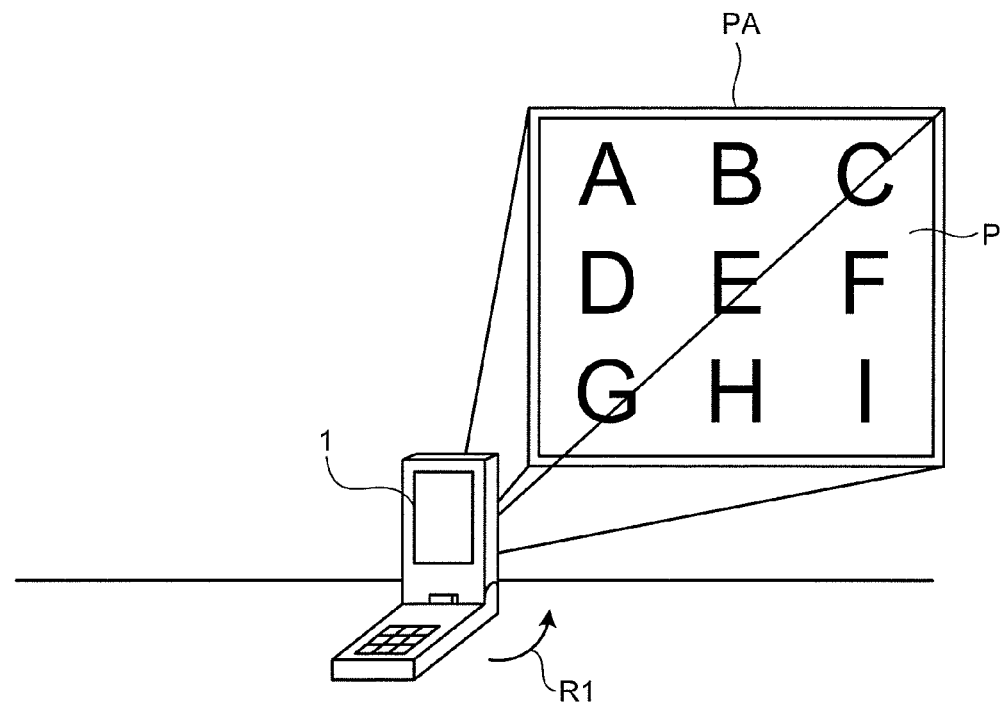
FIG. 4 is an explanatory diagram illustrating a state in which a projector of the mobile electronic device illustrated in FIG. 1 is projecting an image.
Figure 4:
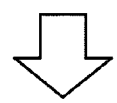
Figure 4:
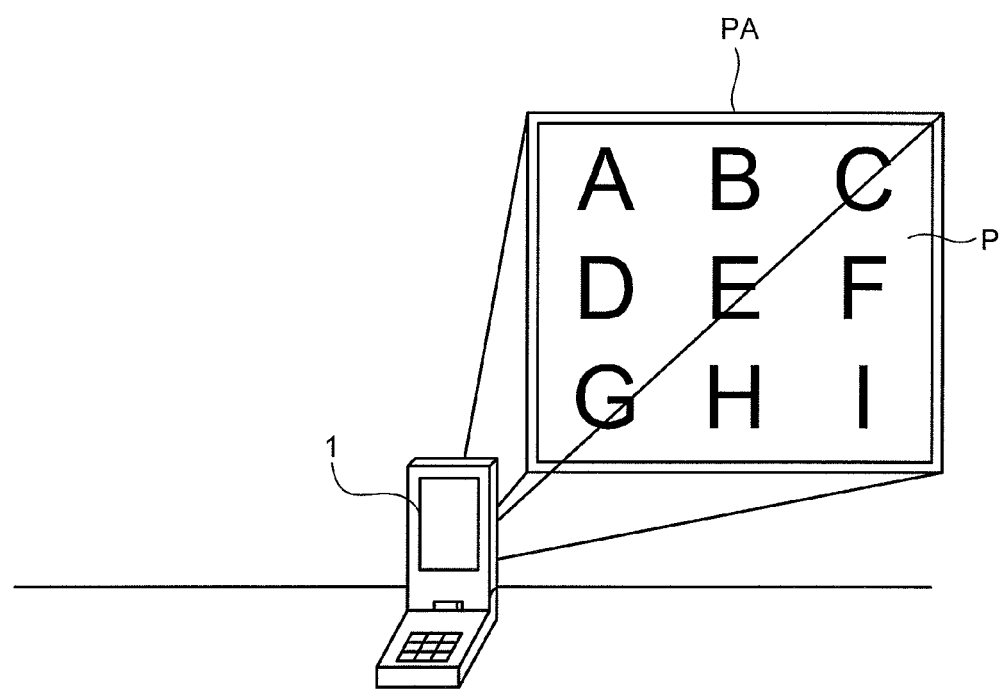

FIG. 4 is an explanatory diagram illustrating a state in which the projector of the mobile electronic device illustrated in FIG. 1 is projecting an image. As explained above, the projector 34 is the image projection unit for projecting an image, and its image projecting surface is exposed to the outside of the housing 1C of the mobile electronic device 1. The mobile electronic device 1 projects an image from the projector 34 and can thereby project an image P to a predetermined area (projection area) PA, as illustrated in FIG. 4, of the image projection object (e.g., a wall surface and a screen) at a location facing the image projecting surface of the projector 34. The operation of the projector 34 is controlled by the processing unit 22, so that the projector 34 projects various videos such as a moving image and a presentation material sent from the processing unit 22, and displays them in the projection area PA.

The camera 40 is an imaging system that is disposed near the light emitting portion of the projector 34 and captures an image of an area including the projection area PA. That is, the camera 40 captures an image in a light emission direction of the projector 34. The camera 40 is the imaging system that captures an image at a wider field angle than a projection field angle of an image projected by the projector 34, and can capture an image of a wider area than the projection area PA where the image is projected by the projector 34.

The processing unit 22 controls the projector 34 and the like based on the image or the like thus captured by the camera 40, so that the image P is projected to the projection area PA in a given size even if the attitude and the position of the mobile electronic device 1 is changed within a predetermined allowable range. For example, even if the mobile electronic device 1 rotates by an angle R1, the processing unit 22, for example, changes the projection direction of the projector 34 to project the image P to the projection area PA.

Figure 5:
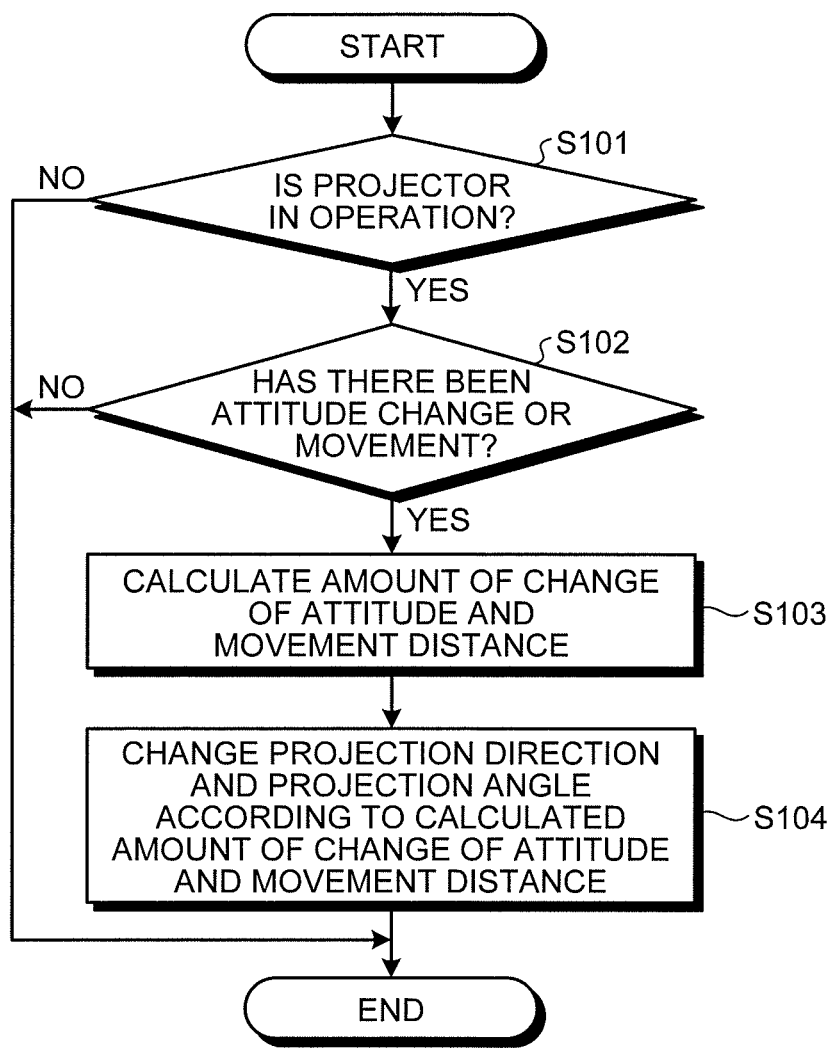
FIG. 5 is a flowchart illustrating an example of a projection operation of the mobile electronic device.

Then, an image projection operation of the projector in the mobile electronic device will be explained below with reference to FIG. 5. FIG. 5 is a flowchart illustrating an example of the projection operation of the mobile electronic device. First of all, at Step S101, the processing unit 22 of the mobile electronic device 1 causes the condition determining unit 22c to determine whether the projector 34 provided in the mobile electronic device 1 is in use. When it is determined that the projector is not in operation at Step S101 (No), i.e., when the condition determining unit 22c determines that the projector 34 is not in use, then the processing unit 22 ends the present control.

When it is determined that the projector 34 is in operation at Step S101 (Yes), i.e., when the condition determining unit 22c determines that the projector 34 is in use, then at Step S102, the processing unit 22 determines whether there has been an attitude change or a movement. In other words, at Step S102, the processing unit 22 causes the condition determining unit 22c to determine whether there has been a movement of the projector 34 provided in the mobile electronic device 1, i.e., whether there has been an attitude change or a movement of the projector 34 (mobile electronic device 1). The condition determining unit 22c can determine whether there has been an attitude change or a movement of the projector 34 based on the image captured by the camera 40 and the focal distance calculated by an auto-focus function. The condition determining unit 22c can also determine whether there has been an attitude change or a movement of the projector 34 by using the detection results of the distance sensor 36 and the acceleration sensor 38. In the present embodiment, a relative movement between the projection plane and the projector 34 is also determined as a movement of the projector 34. In other words, if the distance between the projection plane and the projector 34 has changed, then the condition determining unit 22c determines that the projector 34 has moved. Alternatively, if a move forward toward a projection direction (i.e., toward the projection plane along the projection direction) or a move backward has been detected, then it may be determined that the projector 34 has moved. When it is determined that there has been no change nor movement at Step S102 (No), i.e., when the condition determining unit 22c determines that there has been no movement of the projector 34, then the processing unit 22 ends the present control.

When it is determined that there has been an attitude change or a movement of the projector 34 at Step S102 (Yes), i.e., when the condition determining unit 22c determines that the projector 34 has moved, then at Step S103, the processing unit 22 causes the attitude/position computing unit 22d to calculate an amount of change of the attitude and a movement distance based on the move of the projector 34 (mobile electronic device 1). In other words, the attitude/position computing unit 22d calculates changes of an angle and a distance between the projector 34 and the projection plane where an image is projected. Specifically, the processing unit 22 detects an attitude of the projector 34 based on the detection result of the camera 40 or of the acceleration sensor 38 and compares the attitude with a reference attitude or with a previous attitude to calculate an amount of change of the attitude. The processing unit 22 also detects a distance between the projection plane and the projector 34 based on the detection results of the camera 40 or of the distance sensor 36 and the acceleration sensor 38 and compares the distance with a reference distance or with a previous distance to calculate a movement distance and a movement direction of the projector 34.

After the calculation of the amount of change of the attitude and the movement distance at Step S103, at Step S104, the processing unit 22 causes the projection correcting unit 22e to change a projection direction and a projection angle of the projector 34 according to the amount of change of the attitude and the movement distance calculated at Step S103, and causes the projector 34 to project the image to the same position as the position before the attitude change or the movement in the same size as the previous one. After the completion of the process at Step S104, the processing unit 22 ends the present control. The processing unit 22 repeats the processes while the projector 34 is projecting the image.

The change of the projection direction of the projector 34 (adjustment of the position of a projection image) may be implemented by configuring the projector 34 to be movable and changing the direction of the projector 34 itself, or may be implemented by changing a scan range (turning range) of the mirror included in the drawing device 35. A movable lens may be provided in the light emitting portion of the projector 34, so that the change can be implemented by changing the direction of the lens. The image processor 22b may be configured to generate an image by synthesizing an image to be projected on a transparent layer, so that the change may be implemented by changing the position of the image to be projected on the transparent layer. Moreover, these methods may be combined with each other.

The change of a projection angle of the projector 34 (adjustment of the size of a projection image) may be implemented by changing, for example, a range of a swing angle (turning angle) of the mirror included in the drawing device 35. A movable lens may be provided in the light emitting portion of the projector 34, so that the change can be implemented by changing the distance between the lens and the light source. The image processor 22b may be configured to generate an image by synthesizing an image to be projected on a transparent layer, so that the change can be implemented by changing the size of the image to be projected on the transparent layer. Moreover, these methods may be combined with each other.

Figure 6:
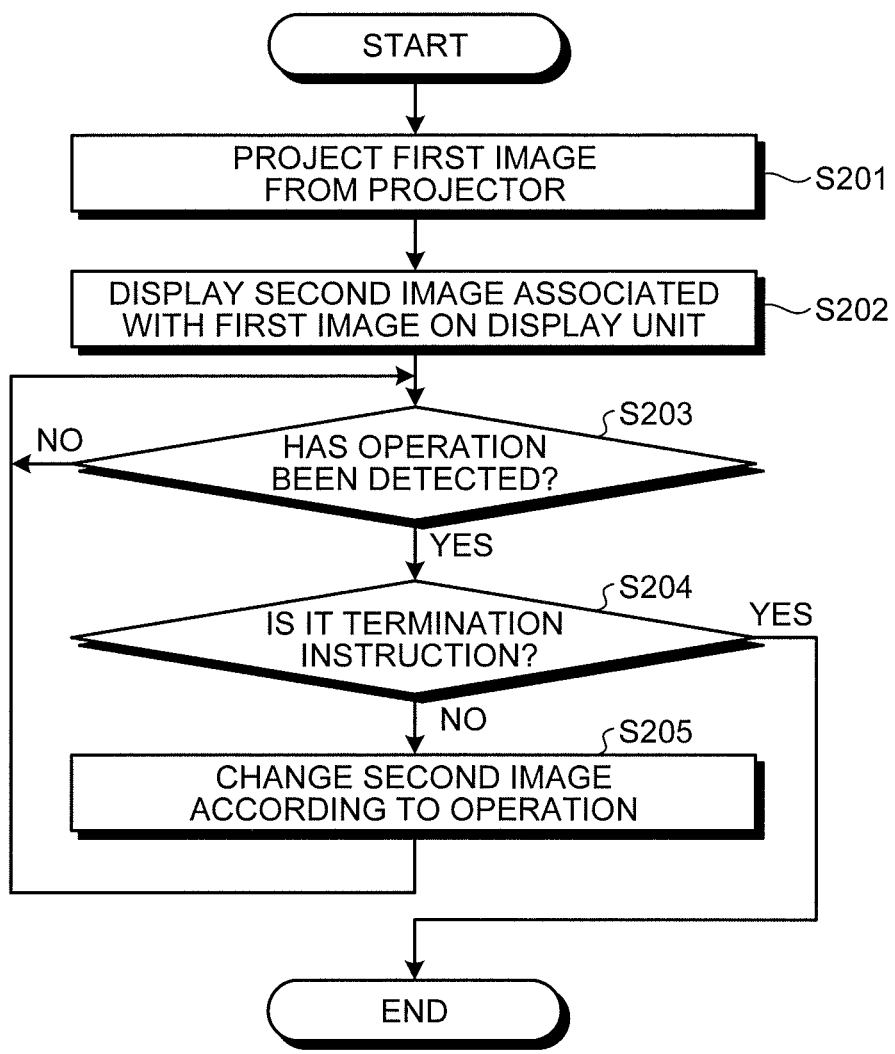
FIG. 6 is a flowchart illustrating an example of an image output operation of the mobile electronic device.

Then, an operation of the mobile electronic device for outputting associated images will be explained with reference to FIG. 6. FIG. 6 is a flowchart illustrating an example of an image output operation of the mobile electronic device. The projection operation illustrated in FIG. 5 is repeatedly executed in parallel to the image output operation illustrated in FIG. 6. First of all, at Step S201, the output controller 22f of the processing unit 22 causes the projector 34 to project a first image. At Step S202, the output controller 22f causes the display unit 32 to display a second image associated with the first image.

Then at Step S203, the output controller 22f determines whether an operation performed for the mobile electronic device 1 has been detected. For the image output operation illustrated in FIG. 6, changing the attitude of the mobile electronic device 1 and changing the position of the mobile electronic device 1 are also detected as operations performed for the mobile electronic device 1 in addition to the operation accepted by the operating unit 13.

When it is determined that an operation performed for the mobile electronic device 1 has not been detected at Step S203 (No), the output controller 22f re-executes the determination performed at Step S203. When it is determined that an operation performed for the mobile electronic device 1 has been detected at Step S203 (Yes), then at Step S204, the output controller 22f determines whether the operation is a predetermined operation of instructing termination of the image output operation. When it is determined that the detected operation is the operation of instructing the termination at Step S204 (Yes), then the output controller 22f ends the present control.

When it is determined that the detected operation is not the operation of instructing the termination (No), i.e., it is determined that the detected operation is an operation related to a change of the image at Step S204, then Step S205, the output controller 22f changes the second image displayed on the display unit 32 according to the detected operation. A correspondence between the operation and the way to change the second image will be explained below with reference to specific examples.

Then, the mobile electronic device 1 will be explained in more detail below. FIG. 7 to FIG. 10 are explanatory diagrams for explaining operations of the mobile electronic device. In FIG. 7 to FIG. 10, the shape of the mobile electronic device 1 is schematically illustrated.

Figure 7:
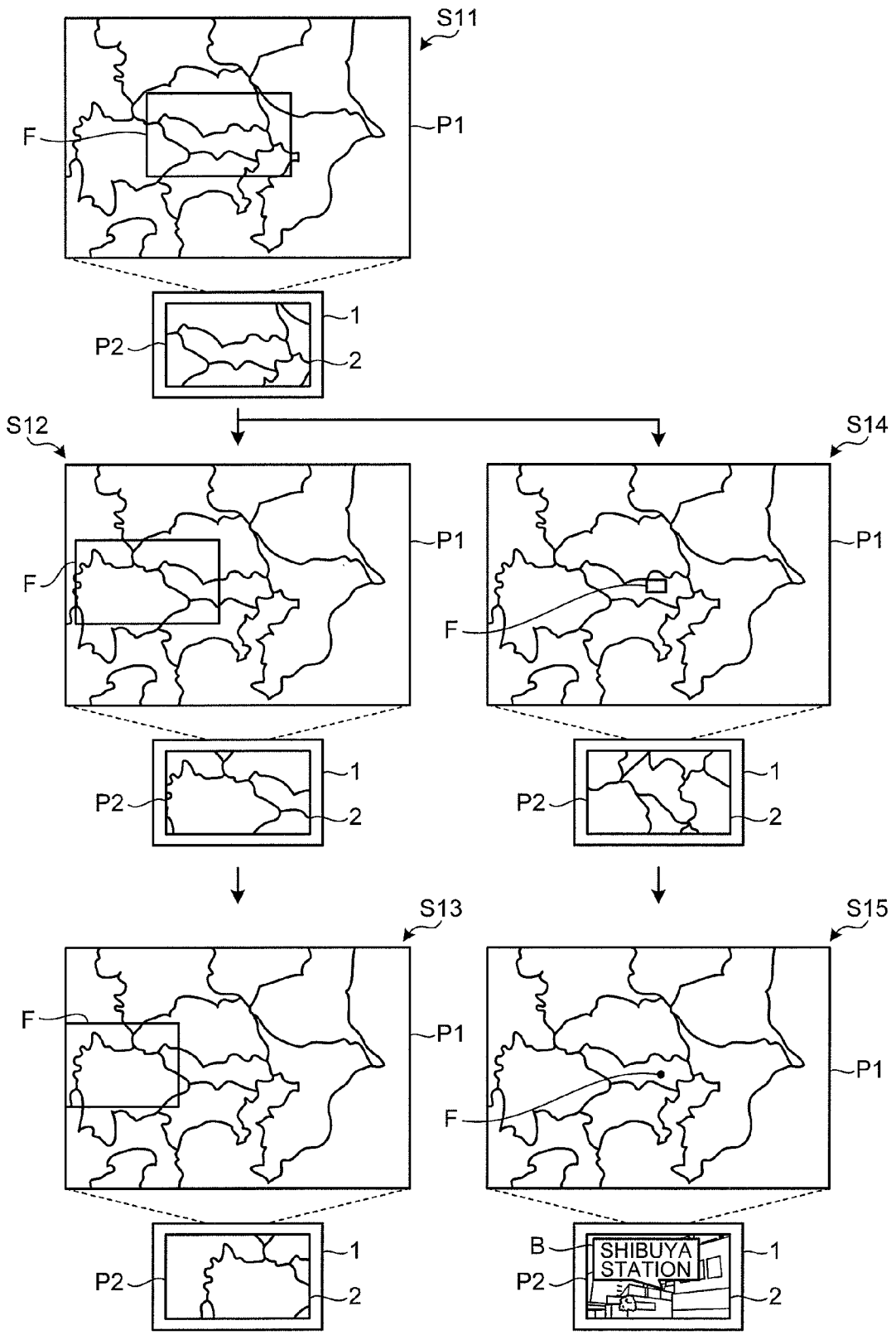
FIG. 7 is an explanatory diagram for explaining operations of the mobile electronic device.

At Step S11 illustrated in FIG. 7, the mobile electronic device 1 projects a map of Kanto region in Japan as a first image P1 from the projector 34. The mobile electronic device 1 displays a map around Tokyo being part of the first image P1, as a second image P2 associated with the first image P1, on the display 2. To represent the position and the area of the second image P2 in the first image P1, the mobile electronic device 1 displays a frame F in the first image P1.

The maps used herein may be, for example, those indicating transportation such as roads and railways, those indicating various facilities such as public facilities and commercial facilities, or those indicating local weather.

In this way, by projecting the map from the projector 34 and at the same time displaying a part of the map on the display 2, the user can check detailed information such as geographic features and names of places in a specific region on the display 2 while widely projecting the map and viewing the wide area. Because the projector 34 can widely project the image, it is suitable for viewing the map of the wide area. Moreover, the display 2 can display an image at a higher resolution than an image projected by the projector 34, and it is therefore suitable for checking a detailed shape and a character in the map.

It is assumed that the user has performed a predetermined operation for scrolling the image displayed on the display 2 left on the operating unit 13. The predetermined operation mentioned here is, for example, an operation of pressing a Left direction key. When detecting the operation, as illustrated at Step S12, the mobile electronic device 1 changes the second image P2 displayed on the display 2 to a map on the left side of the map at Step S11 while allowing the first image P1 to be projected in the same size and at the same position. To represent the change of the position of the second image P2 in the first image P1, the mobile electronic device 1 moves the frame F leftward. The user can also scroll the image displayed on the display 2 in any direction other than the left.

In this way, by changing the portion displayed as the second image P2 without changing the position and the size of the first image P1, the user can change a region whose details are to be checked while viewing the wide area.

Then, it is assumed that the user has further performed the predetermined operation for scrolling the image displayed on the display 2 left on the operating unit 13. When detecting the operation, as illustrated at Step S13, the mobile electronic device 1 changes the second image P2 displayed on the display 2 to a map on the left side of the map at Step S12 while allowing the first image P1 to be projected in the same size and at the same position. To represent the change of the position of the second image P2 in the first image P1, the mobile electronic device 1 moves the frame F leftward. At Step S13, as a result of displaying the second image P2 displayed on the display 2 on the further left side, a map outside the area projected as the first image P1 is displayed on the display 2.

In this way, by displaying the map, as the second image P2, outside the area projected as the first image P1 on the display 2, the user can check a geographical shape or the like of the map outside thereof while viewing the wide area.

It is assumed that the user has performed a predetermined operation for enlarging an image displayed on the display 2 on the operating unit 13 from the state at Step S11. The predetermined operation mentioned here is, for example, an operation of long press of an Up direction key. When detecting the operation, as illustrated at Step S14, the mobile electronic device 1 enlarges the second image P2 displayed on the display 2 more than that at Step S11 while allowing the first image P1 to be projected in the same size and at the same position. To represent the change of the area of the second image P2 in the first image P1, the mobile electronic device 1 reduces the frame F. At Step S14, as a result of enlarging the second image P2 displayed on the display 2, a map of Shibuya Ward as part of Tokyo is displayed on the display 2.

In this way, by enlarging the second image P2 without changing the position and the size of the first image P1, the user can check a more detailed geographical shape or the like while viewing the wide area.

When the user performs a predetermined operation for reducing the image displayed on the display 2 on the operating unit 13 from the state at Step S11, the mobile electronic device 1 reduces the second image P2 displayed on the display 2 more than that at Step S11 while allowing the first image P1 to be projected in the same size and at the same position. As a result, for example, a map of the whole of Japan is displayed as the second image P2 on the display 2.

Subsequently, it is assumed that the user has further performed the predetermined operation for enlarging an image displayed on the display 2 on the operating unit 13. When detecting the operation, as illustrated at Step S15, the mobile electronic device 1 enlarges the second image P2 displayed on the display 2 more than that at Step S14 while allowing the first image P1 to be projected in the same size and at the same position. To represent the change of the area of the second image P2 in the first image P1, the mobile electronic device 1 reduces the frame F.

When a magnification factor of the map exceeds a predetermined threshold upon display of the map on the display 2, the mobile electronic device 1 changes the display of elements such as buildings included in the map from a two-dimensional planar display to a three-dimensional stereoscopic display. Moreover, when the magnification factor of the map exceeds the predetermined threshold, the mobile electronic device 1 adds previously registered detailed information, related to elements such as buildings, to the elements for display.

The three-dimensional stereoscopic display of the elements may be implemented by displaying, for example, images of previously captured elements, or may be implemented by virtually generating three-dimensional shapes through a computing process based on pre-prepared data for three-dimensional shape model of the elements.

At Step S15, as a result of excess of the magnification factor of the map over the predetermined threshold, Shibuya station as part of Shibuya Ward is stereoscopically displayed on the display 2. At Step S15, as the detailed information for the elements included in the map, a balloon B including the name of the building "Shibuya station" is added to the stereoscopic shape of the Shibuya station for display. As the detailed information for an element included in the map, for example, an address, a telephone number, an internal photo, or a type of business may be displayed as well as the name of building.

In this way, by changing a display mode of the element included in the image according to a change of the magnification factor, information can be provided to the user in the density and the form suitable for the current magnification factor, thus improving user-friendliness. The example illustrated in FIG. 7 represents an example of changing the display mode of the element included in the image in two steps according to the change of the magnification factor. However, the display mode of the element may be changed in three steps or more according to the change of the magnification factor.

Subsequently, FIG. 8 will be explained below. FIG. 7 depicts the example of detecting the operation performed on the operating unit 13 as an operation performed for the mobile electronic device 1, while FIG. 8 depicts an example of detecting a change of the attitude of the mobile electronic device 1 or a change of the position of the mobile electronic device 1 as an operation performed for the mobile electronic device 1.

Figure 8:
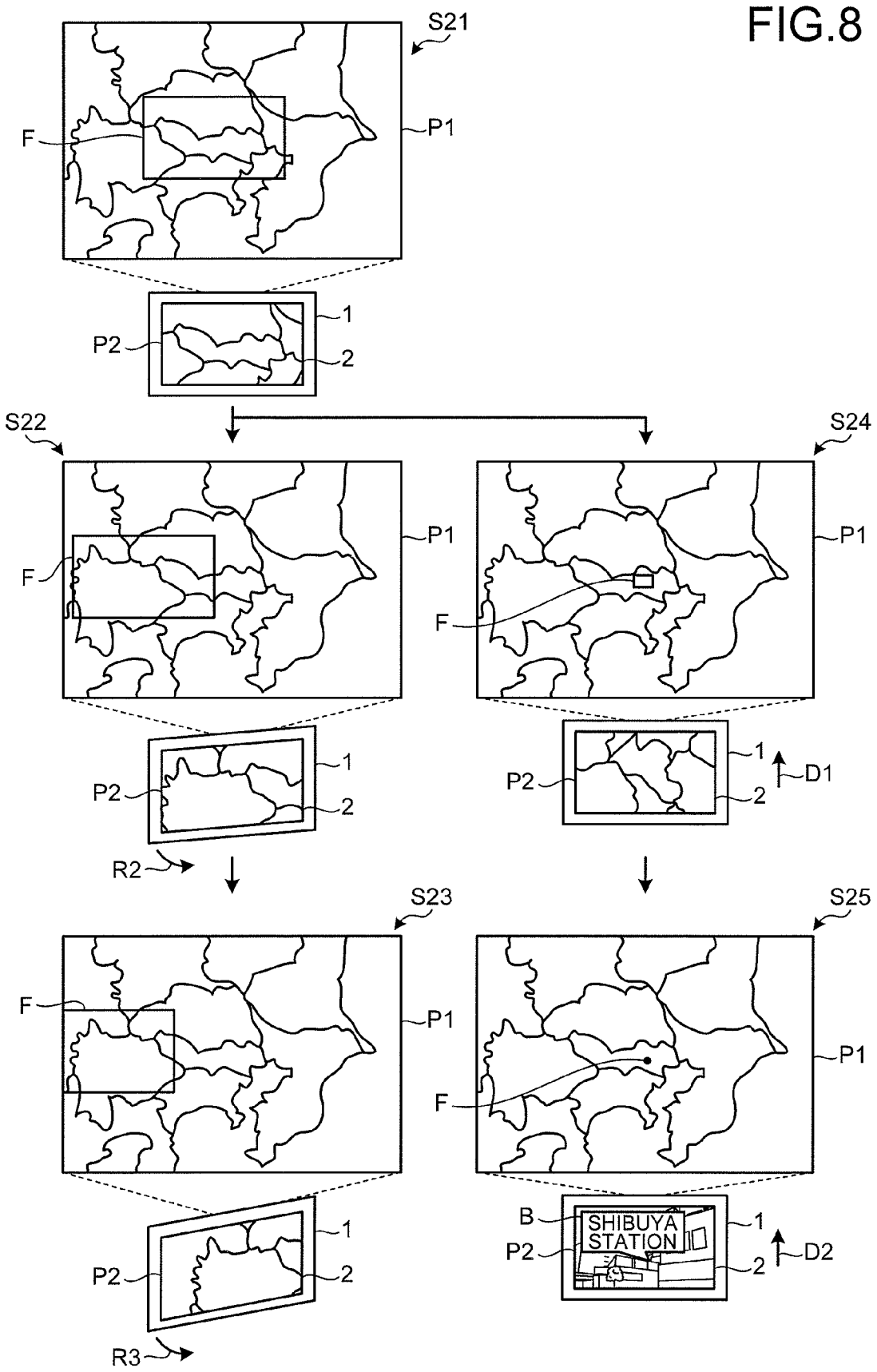
FIG. 8 is an explanatory diagram for explaining operations of the mobile electronic device.

At Step S21 illustrated in FIG. 8, similarly to Step S11 illustrated in FIG. 7, the mobile electronic device 1 projects the map of Kanto region in Japan as the first image P1 from the projector 34. The mobile electronic device 1 displays the map around Tokyo being part of the first image P1, as the second image P2 associated with the first image P1, on the display 2. To represent the position and the area of the second image P2 in the first image P1, the mobile electronic device 1 displays the frame F in the first image P1.

It is assumed that the user has rotated the mobile electronic device 1 rightward by an angle R2. When detecting the operation, as illustrated at Step S22, the mobile electronic device 1 changes the second image P2 displayed on the display 2 to a map on the left side of the map at Step S21 while allowing the first image P1 to be projected in the same size and at the same position. To represent the change of the position of the second image P2 in the first image P1, the mobile electronic device 1 moves the frame F leftward.

In this way, by changing the portion displayed as the second image P2 according to the change of the attitude of the mobile electronic device 1 without changing the position and the size of the first image P1, the user can change a region whose details are to be checked with an intuitive operation while viewing the wide area. It is assumed that a relationship between the amount of change of the attitude of the mobile electronic device 1 and the amount of movement of the portion displayed as the second image P2 is previously determined. When detecting the user operation of moving the position of the mobile electronic device 1 leftward, similarly to Step S22, the mobile electronic device 1 also changes the second image P2 displayed on the display 2 to a map on the left side of the map at Step S21.

It is assumed that the user has further rotated the mobile electronic device 1 rightward by an angle R3. When detecting the operation, as illustrated at Step S23, the mobile electronic device 1 changes the second image P2 displayed on the display 2 to a map on the left side of the map at Step S22 while allowing the first image P1 to be projected in the same size and at the same position. To represent the change of the position of the second image P2 in the first image P1, the mobile electronic device 1 moves the frame F leftward. At Step S23, as a result of displaying the second image P2 displayed on the display 2 on the further left side, a map outside the area projected as the first image P1 is displayed on the display 2. When the user performs an operation of moving the position of the mobile electronic device 1 leftward, a map outside the area projected as the first image P1 may also be displayed on the display 2.

It is assumed that the user has moved the mobile electronic device 1 in the direction of the projection object by a distance D1 from the state at Step S21. When detecting the operation, as illustrated at Step S24, the mobile electronic device 1 enlarges the second image P2 displayed on the display 2 more than that at Step S21 while allowing the first image P1 to be projected in the same size and at the same position. To represent the change of the area of the second image P2 in the first image P1, the mobile electronic device 1 reduces the frame F.

In this way, by enlarging the second image P2 according to the change of the distance between the mobile electronic device 1 and the projection object without changing the position and the size of the first image P1, the user can check a more detailed geographical shape or the like with an intuitive operation while viewing the wide area. It is assumed that a relationship between the movement distance of the mobile electronic device 1 and the magnification factor of the second image P2 is previously determined.

When the user moves the mobile electronic device 1 in an opposite direction to the projection object from the state at Step S21, the mobile electronic device 1 reduces the second image P2 displayed on the display 2 more than that at Step S21 while allowing the first image P1 to be projected in the same size and at the same position. As a result, for example, a map of the whole of Japan is displayed as the second image P2 on the display 2.

Subsequently, it is assumed that the user has further moved the mobile electronic device 1 in the direction of the projection object by a distance D2. When detecting the operation, as illustrated at Step S25, the mobile electronic device 1 enlarges the second image P2 displayed on the display 2 more than that at Step S24 while allowing the first image P1 to be projected in the same size and at the same position. To represent the change of the area of the second image P2 in the first image P1, the mobile electronic device 1 reduces the frame F.

At Step S25, as a result of excess of the magnification factor of the map over the predetermined threshold, Shibuya station as part of Shibuya Ward is stereoscopically displayed on the display 2. At Step S25, as the detailed information for the elements included in the map, the balloon B including a character string "Shibuya station" is added to the stereoscopic shape of the Shibuya station for display.

In this way, when the change of the attitude of the mobile electronic device 1 or the change of the position thereof is detected as an operation performed for the mobile electronic device 1, the same control as that when the operation performed on the operating unit 13 is detected as the operation performed for the mobile electronic device 1 is also performed.

Subsequently, FIG. 9 will be explained below. FIG. 7 and FIG. 8 depict the examples of using the map as an image, while FIG. 9 depicts an example of using a photo as an image.

Figure 9:
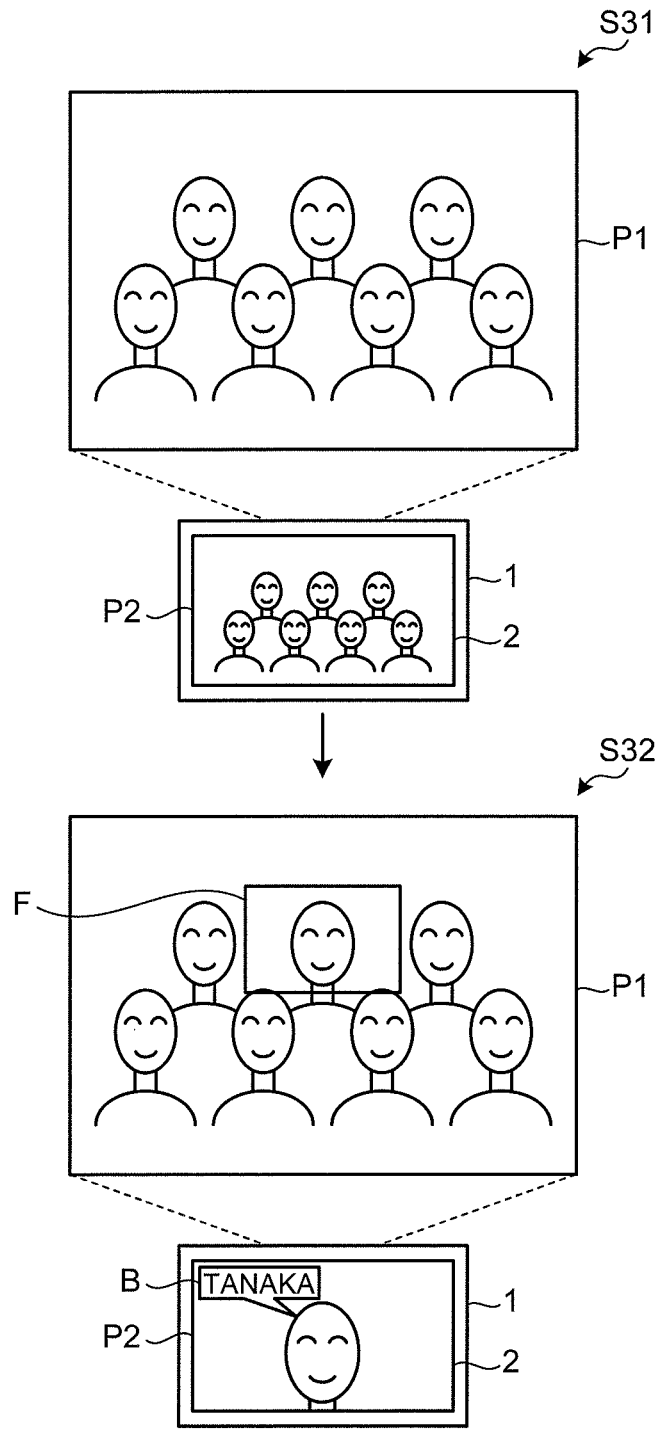
FIG. 9 is an explanatory diagram for explaining operations of the mobile electronic device.

At Step S31 illustrated in FIG. 9, the mobile electronic device 1 projects a group photo of people as the first image P1 from the projector 34. The mobile electronic device 1 displays the same group photo as the first image P1, as the second image P2 associated with the first image P1, on the display 2.

It is assumed that the user has performed a predetermined operation for enlarging the image displayed on the display 2 on the operating unit 13 or the user has moved the mobile electronic device 1 in the direction of the projection object. When detecting the operation, as illustrated at Step S32, the mobile electronic device 1 enlarges the second image P2 displayed on the display 2 more than that at Step S31 while allowing the first image P1 to be projected in the same size and at the same position. To represent the position and the area of the second image P2 in the first image P1, the mobile electronic device 1 displays the frame F in the first image P1. At Step S32, as a result of excess of the magnification factor of the photo over a predetermined threshold, the mobile electronic device 1 adds a balloon B including the name of a person "Tanaka" to the enlarged person for display as detailed information for the element (person) included in the photo.

In this way, by performing the same control as that illustrated in FIG. 7 and FIG. 8, the user operates the mobile electronic device 1 to thereby enable to check details of any image other than the map while viewing the whole through the projected image. FIG. 9 depicts only the example of enlarging the second image P2; however, the user operates the mobile electronic device 1 to thereby enable to slide or reduce the second image P2.

Figure 10:
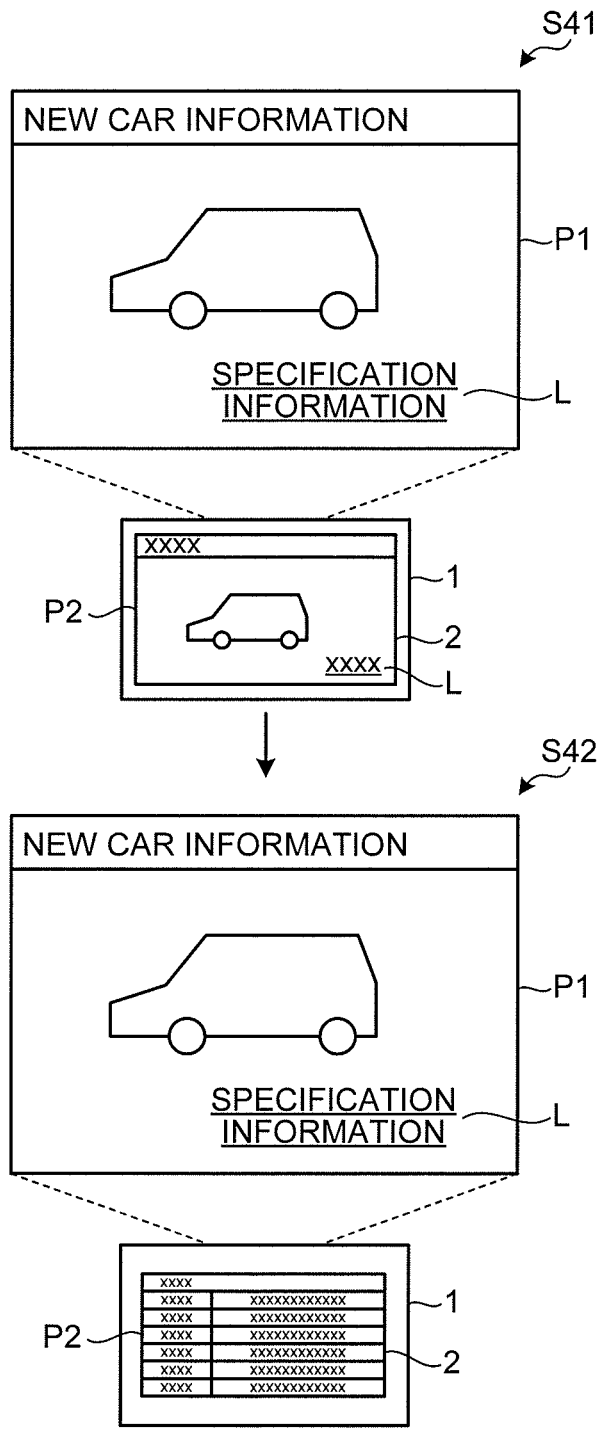
FIG. 10 is an explanatory diagram for explaining operations of the mobile electronic device.

Subsequently, FIG. 10 will be explained below. FIG. 10 depicts an example of using images related in the context as images associated with each other.

At Step S41 illustrated in FIG. 10, the mobile electronic device 1 projects a WEB page including a photo representing the exterior of a new car as the first image P1 from the projector 34. The projected WEB page includes a link L to another WEB page displaying specification information of the new car. The mobile electronic device 1 displays the same WEB page as the first image P1, as the second image P2 associated with the first image P1, on the display 2. The WEB page is acquired through wireless communication by the communication unit 26.

It is assumed that the user has performed a predetermined operation on the operating unit 13 to select the link L. When detecting the operation, as illustrated at Step S42, the mobile electronic device 1 displays the WEB page displaying the specification information of the new car as the second image P2 on the display 2 while allowing the first image P1 to be projected in the same size and at the same position.

In this way, by displaying the next screen on the display 2 while allowing the current screen to be projected from the projector 34, the user can check the content of the next screen while viewing the current screen.

Figure 11:
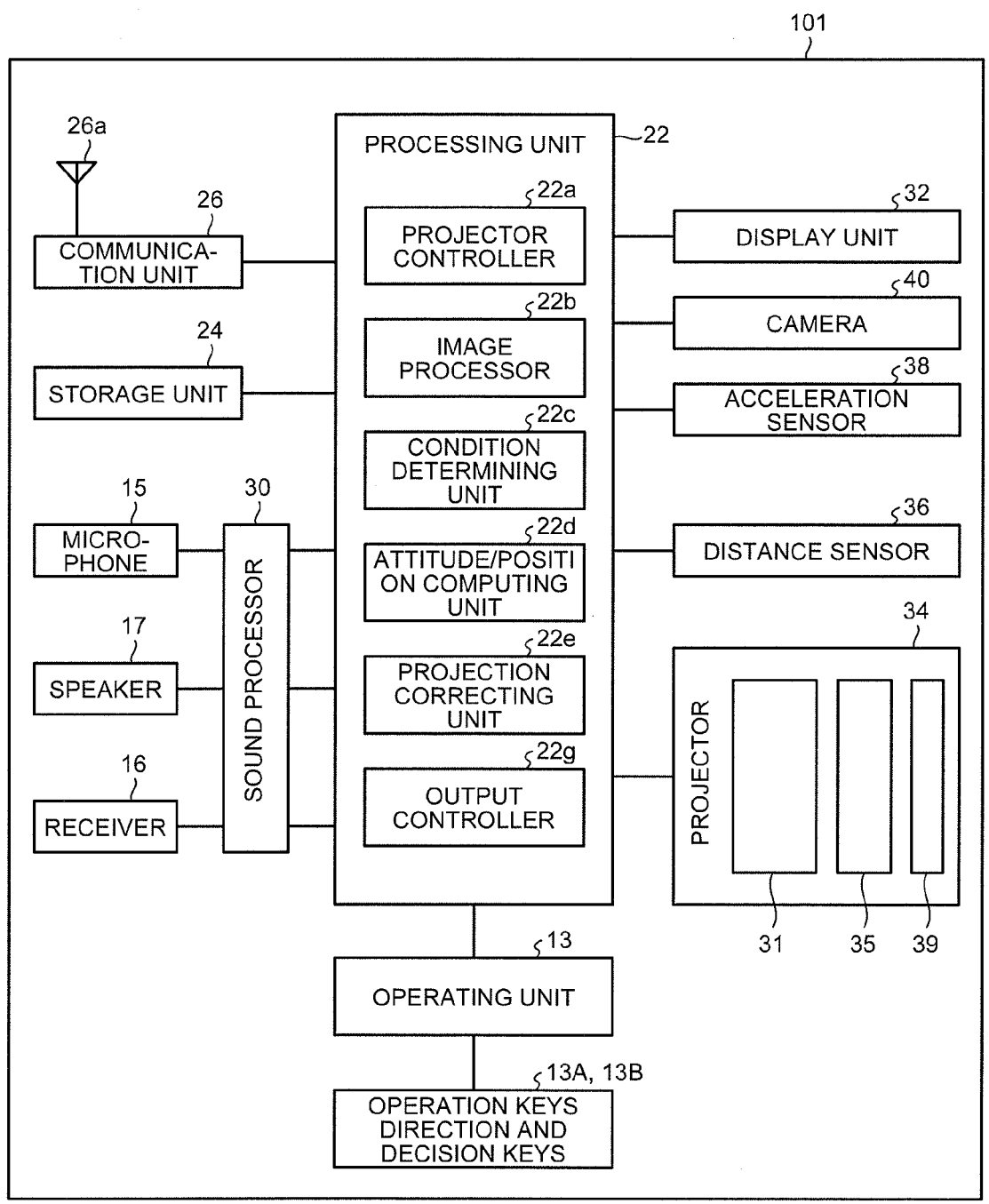
FIG. 11 is a block diagram illustrating a schematic configuration of a mobile electronic device according to a second embodiment.

Then, a second embodiment will be explained below. In the explanation below, the same signs as these of the already explained portions are assigned to those the same as the already explained portions, and overlapping explanation may be omitted. FIG. 11 is a block diagram illustrating a schematic configuration of functions of a mobile electronic device according to the second embodiment. As illustrated in FIG. 11, a mobile electronic device 101 includes the processing unit 22, the storage unit 24, the communication unit 26, the operating unit 13, the sound processor 30, the display unit 32, the projector 34, the distance sensor 36, the acceleration sensor 38 being a move detector, and the camera 40.

In the present embodiment, the processing unit 22 includes the projector controller 22a, the image processor 22b, the condition determining unit 22c, the attitude/position computing unit 22d, the projection correcting unit 22e, and an output controller 22g.

The output controller 22g projects a first image from the projector 34 and displays a second image associated with the first image on the display unit 32. The output controller 22g changes the content of the first image P1 to be projected according to the changes of the attitude and the position of the mobile electronic device 101 calculated by the attitude/position computing unit 22d while displaying the second image with no change.

The processing unit 22 controls, similarly to the example of the mobile electronic device 1 in FIG. 4, the projector 34 or the like based on the image or the like captured by the camera 40, so that the image P is projected to the projection area PA in a given size even if the attitude and the position of the mobile electronic device 101 are changed within a predetermined allowable range. For example, even if the mobile electronic device 101 rotates by the angle R1, the processing unit 22, for example, changes the projection direction of the projector 34 to project the image P to the projection area PA. This operation is implemented by executing the projection operation illustrated in FIG. 5.

Figure 12:
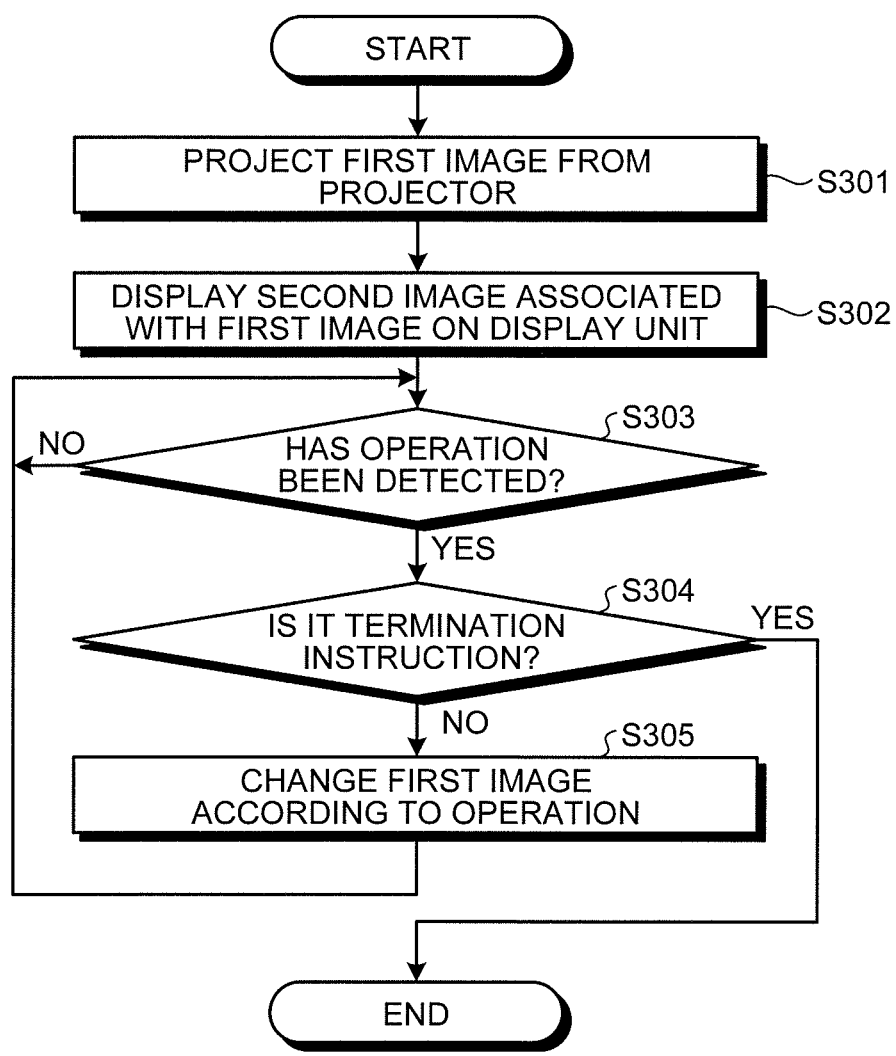
FIG. 12 is a flowchart illustrating an example of an image output operation of the mobile electronic device.

Then, an operation of the mobile electronic device for outputting associated images will be explained below with reference to FIG. 12. FIG. 12 is a flowchart illustrating an example of an image output operation of the mobile electronic device. The projection operation illustrated in FIG. 5 is repeatedly executed in parallel with the image output operation illustrated in FIG. 12. First of all, at Step S301, the output controller 22g of the processing unit 22 projects a first image from the projector 34. Then at Step S302, the output controller 22g displays a second image associated with the first image on the display unit 32.

At Step S303, the output controller 22g determines whether an operation performed for the mobile electronic device 101 has been detected. For the image output operation illustrated in FIG. 12, in addition to an operation accepted by the operating unit 13, changing the attitude of the mobile electronic device 101 and changing the position of the mobile electronic device 101 are also detected as operations performed for the mobile electronic device 101.

When it is determined that an operation performed for the mobile electronic device 101 has not been detected at Step S303 (No), the output controller 22g re-executes the determination at Step S303. When it is determined that an operation performed for the mobile electronic device 101 has been detected at Step S303 (Yes), then at Step S304, the output controller 22g determines whether the operation is a predetermined operation of instructing termination of the image output operation. When it is determined that the detected operation is an operation of instructing the termination at Step S304 (Yes), the output controller 22g ends the present control.

When it is determined that the detected operation is not an operation of instructing the termination (No), i.e., it is determined that the detected operation is an operation related to a change of the image at Step S304, then at Step S305, the output controller 22g changes the content of the first image projected from the projector 34 according to the detected operation. A correspondence between the operation and the way to change the first image will be explained below with reference to specific examples.

Then, the mobile electronic device 101 will be explained in more detail below using the specific examples. FIG. 13 to FIG. 16 are explanatory diagrams for explaining the operations of the mobile electronic device. In FIG. 13 to FIG. 16, the shape of the mobile electronic device 101 is schematically illustrated.

Figure 13:
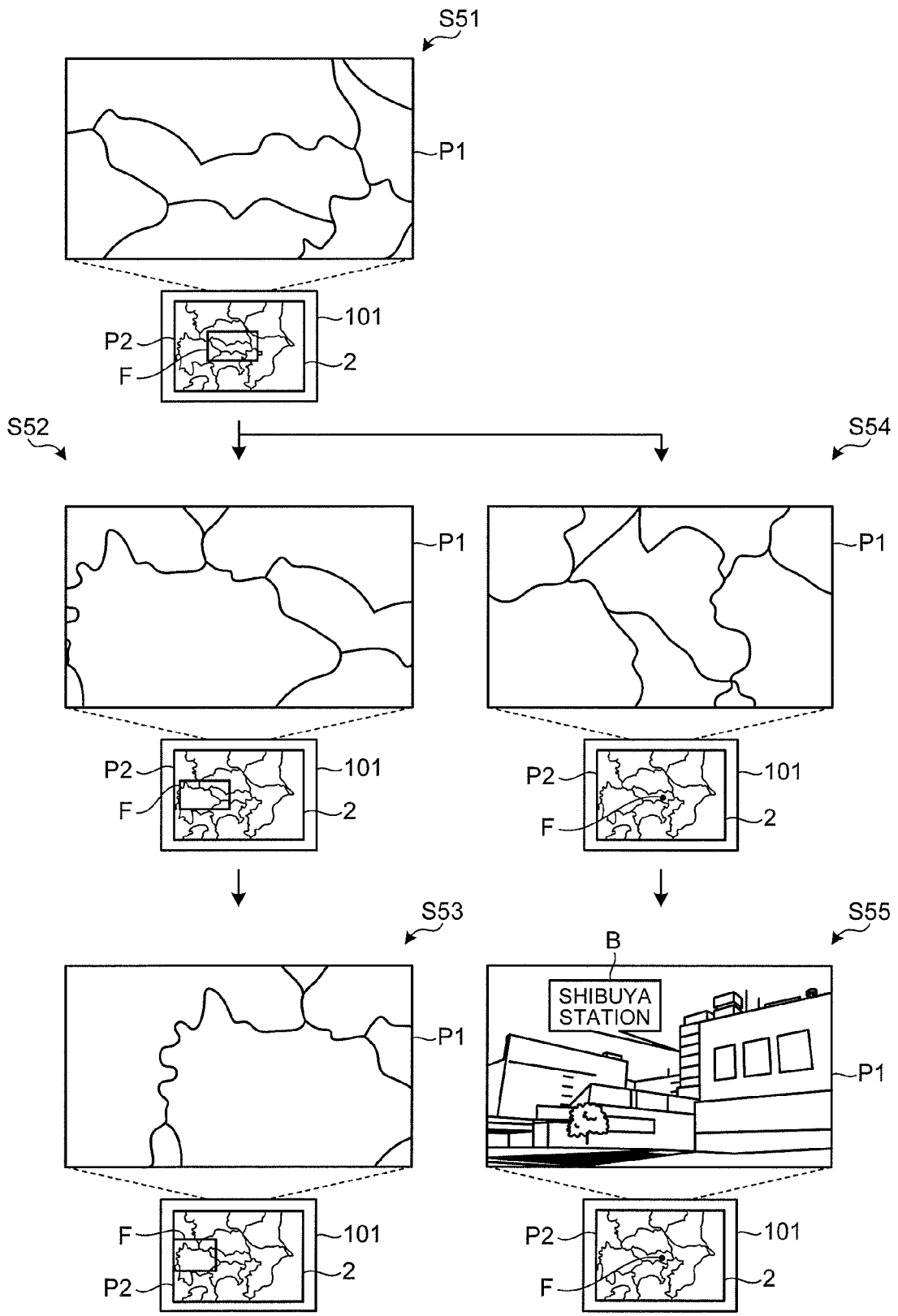
FIG. 13 is an explanatory diagram for explaining operations of the mobile electronic device.

At Step S51 illustrated in FIG. 13, the mobile electronic device 101 projects the map around Tokyo being part of Kanto region in Japan as the first image P1. The mobile electronic device 101 displays the map of Kanto region including Tokyo as the second image P2 associated with the first image P1 on the display 2. To represent the position and the area of the first image P1 in the second image P2, the mobile electronic device 101 displays the frame F in the second image P2.

The maps used herein may be, for example, those indicating transportation such as roads and railways, those indicating various facilities such as public facilities and commercial facilities, or those indicating local weather.

In this way, by displaying the overall map on the display 2 and at the same time projecting a part of the map from the projector 34, the user can check detailed information such as geographic features and names of places in a specific region on the zoomed map widely projected while viewing the map of the wide area on the display 2. Because the display 2 can display an image at a high resolution, even if the overall map is displayed, its detailed portion is not difficult to see. Although an image projected by the projector 34 has a comparatively low resolution, by enlarging the image for projection, it becomes easy for the user to recognize detailed shapes and characters in the map. By using the display 2 and the projector 34 in combination with each other, an operation of identifying a target region from the overall map and an operation of recognizing detailed information of the target region can be effectively performed.

It is assumed that the user has performed a predetermined operation for scrolling the image projected from the projector 34 left on the operating unit 13. The predetermined operation mentioned here is, for example, an operation of pressing a Left direction key. When detecting the operation, as illustrated at Step S52, the mobile electronic device 101 changes the first image P1 projected from the projector 34 to a map on the left side of the map at Step S51 while allowing the second image P2 of the same content to be displayed. At this time, the mobile electronic device 101 changes the content of the first image P1 but does not change the position where the first image P1 is projected and its size. To represent the change of the position of the first image P1 in the second image P2, the mobile electronic device 101 moves the frame F leftward. The user can also scroll the image projected from the projector 34 in any direction other than the left.

In this way, by changing the portion projected as the first image P1 without changing the content of the second image P2, the user can change a region whose details are to be checked while viewing the wide area. Moreover, the position and the size of the first image P1 are not changed, which does not require the user to largely move his/her visual line.

Then, it is assumed that the user has further performed the predetermined operation for scrolling the image projected from the projector 34 left on the operating unit 13. When detecting the operation, as illustrated at Step S53, the mobile electronic device 101 changes the first image P1 projected from the projector 34 to a map on the left side of the map at Step S52 while allowing the second image P2 of the same content to be displayed. At this time also, the mobile electronic device 101 changes the content of the first image P1 but does not change the position where the first image P1 is projected and its size. To represent the change of the position of the first image P1 in the second image P2, the mobile electronic device 101 moves the frame F leftward. At Step S53, as a result of changing the first image P1 projected from the projector 34 to one on the left side, a map outside the area displayed as the second image P2 is projected from the projector 34.

In this way, by projecting the map, as the first image P1, outside the area displayed as the second image P2 from the projector 34, the user can check a geographical shape and the like of the outside of the area while viewing the wide area.

It is assumed that the user has performed a predetermined operation for enlarging an image projected from the projector 34 on the operating unit 13 from the state at Step S51. The predetermined operation mentioned here is, for example, an operation of long press of an Up direction key. When detecting the operation, as illustrated at Step S54, the mobile electronic device 101 enlarges the first image P1 projected from the projector 34 more than that at Step S51 while allowing the second image P2 of the same content to be displayed. At this time, the mobile electronic device 101 changes the content of the first image P1 but does not change the position where the first image P1 is projected and its size. To represent the change of the area of the first image P1 in the second image P2, the mobile electronic device 101 reduces the frame F. At Step S54, as a result of enlarging the first image P1 projected from the projector 34, the map of Shibuya Ward as part of Tokyo is projected from the projector 34.

In this way, by enlarging the first image P1 while allowing the second image P2 of the same content to be displayed, the user can check a more detailed geographical shape or the like while viewing the wide area.

When the user performs a predetermined operation for reducing the image projected from the projector 34 on the operating unit 13 from the state at Step S51, the mobile electronic device 101 reduces the first image P1 projected from the projector 34 more than that at Step S51 while allowing the second image P2 of the same content to be displayed. As a result, for example, the map of Kanto or the map of the whole of Japan is projected as the first image P1 from the projector 34.

Subsequently, it is assumed that the user has further performed the predetermined operation for enlarging the image projected from the projector 34 on the operating unit 13. When detecting the operation, as illustrated at Step S55, the mobile electronic device 101 enlarges the first image P1 projected from the projector 34 more than that at Step S54 while allowing the second image P2 of the same content to be displayed. At this time also, the mobile electronic device 101 changes the content of the first image P1 but does not change the position where the first image P1 is projected and its size. To represent the change of the area of the first image P1 in the second image P2, the mobile electronic device 101 reduces the frame F.

When the magnification factor of the map exceeds a predetermined threshold upon projection of the map from the projector 34, the mobile electronic device 101 changes the display mode of elements such as buildings included in the map from a two-dimensional planar display to a three-dimensional stereoscopic display. Moreover, when the magnification factor of the map exceeds the predetermined threshold, the mobile electronic device 101 adds previously registered detailed information, related to elements such as buildings, to the elements for projection.

The three-dimensional stereoscopic display of the elements may be implemented by displaying, for example, images of previously captured elements or may be implemented by virtually generating three-dimensional shapes by arithmetic processing based on pre-prepared data for three-dimensional shape model of the elements.

At Step S55, as a result of excess of the magnification factor of the map over the predetermined threshold, Shibuya station as part of Shibuya Ward is stereoscopically projected from the projector 34. At Step S55, as the detailed information for the elements included in the map, the balloon B including the name of the building "Shibuya station" is added to the stereoscopic shape of the Shibuya station for projection. As the detailed information for an element included in the map, for example, an address, a telephone number, an internal photo, or a type of business may be displayed as well as the name of building.

In this way, by changing the display mode of the element included in the image according to a change of the magnification factor, information can be provided to the user in the density and the form suitable for the current magnification factor, thus improving user-friendliness. The example illustrated in FIG. 13 represents an example of changing the display mode of the element included in the image in two steps according to the change of the magnification factor. However, the display mode of the element may be changed in three steps or more according to the change of the magnification factor.

Subsequently, FIG. 14 will be explained below. FIG. 13 depicts the example of detecting the operation performed on the operating unit 13 as an operation performed for the mobile electronic device 101, while FIG. 14 depicts an example of detecting a change of the attitude of the mobile electronic device 101 or a change of the position of the mobile electronic device 101 as an operation performed for the mobile electronic device 101.

Figure 14:
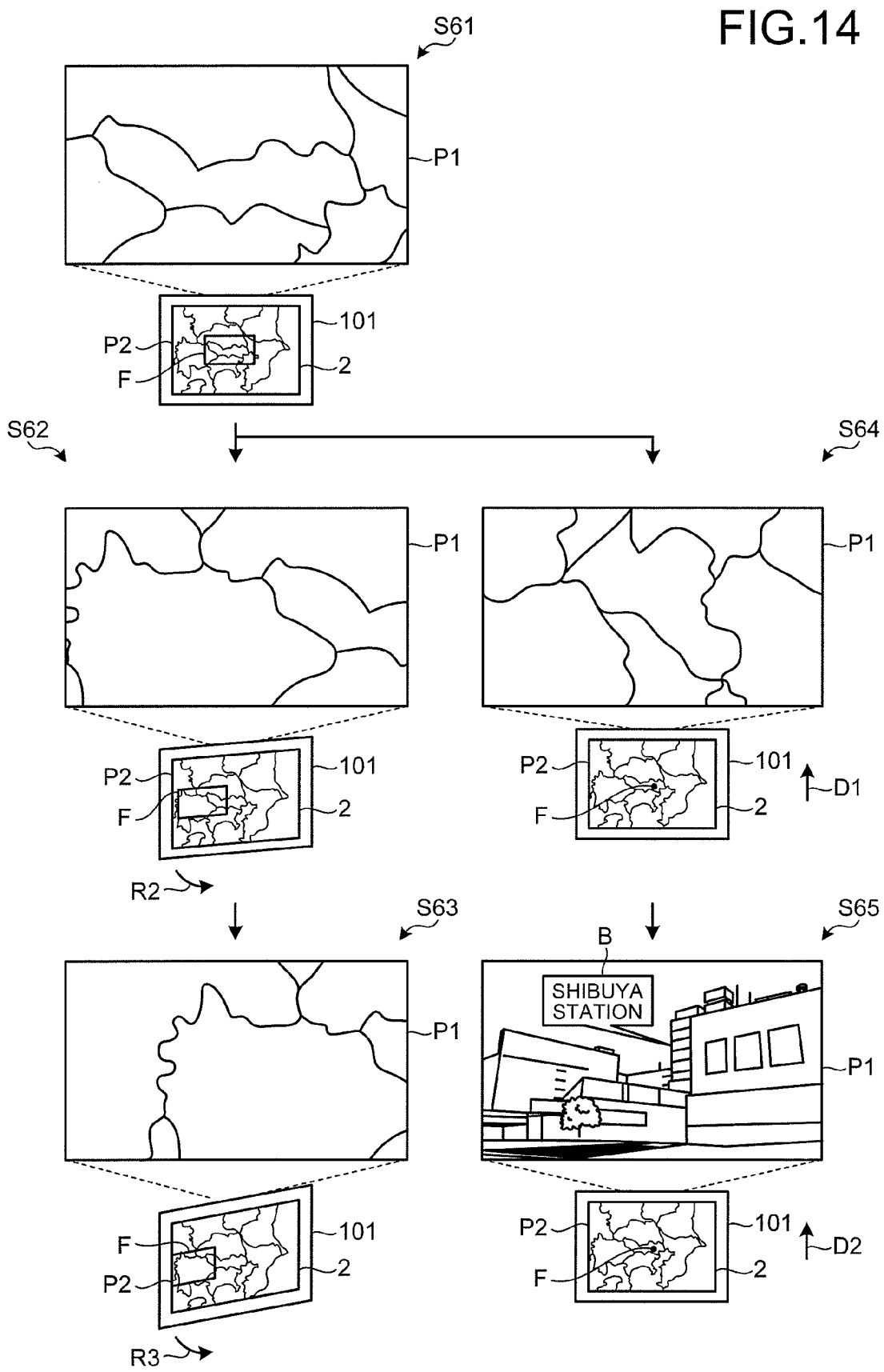
FIG. 14 is an explanatory diagram for explaining operations of the mobile electronic device.

At Step S61 illustrated in FIG. 14, similarly to Step S51 illustrated in FIG. 13, the mobile electronic device 101 projects the map around Tokyo being part of Kanto region in Japan as the first image P1 from the projector 34. The mobile electronic device 101 displays the map of Kanto region including Tokyo as the second image P2 associated with the first image P1 on the display 2. To represent the position and the area of the first image P1 in the second image P2, the mobile electronic device 101 displays the frame F in the second image P2.

It is assumed that the user has rotated the mobile electronic device 101 rightward by the angle R2. When detecting the operation, as illustrated at Step S62, the mobile electronic device 101 changes the first image P1 projected from the projector 34 to a map on the left side of the map at Step S61 while allowing the second image P2 of the same content to be displayed. At this time, the mobile electronic device 101 changes the content of the first image P1 but does not change the position where the first image P1 is projected and its size. To represent the change of the position of the first image P1 in the second image P2, the mobile electronic device 101 moves the frame F leftward.

In this way, by changing the portion projected as the first image P1 according to the change of the attitude of the mobile electronic device 101 without changing the content of the second image P2, the user can change a region whose details are to be checked with an intuitive operation while viewing the wide area. It is assumed that a relationship between the amount of change of the attitude of the mobile electronic device 101 and the amount of movement of the portion projected as the first image P1 is previously determined. When detecting the user operation of moving the position of the mobile electronic device 101 leftward, similarly to Step S62, the mobile electronic device 101 also changes the first image P1 projected from the projector 34 to a map on the left side of the map at Step S61.

It is assumed that the user has further rotated the mobile electronic device 101 rightward by the angle R3. When detecting the operation, as illustrated at Step S63, the mobile electronic device 101 changes the first image P1 projected from the projector 34 to a map on the left side of the map at Step S62 while allowing the second image P2 of the same content to be displayed. At this time also, the mobile electronic device 101 changes the content of the first image P1 but does not change the position where the first image P1 is projected and its size. To represent the change of the position of the first image P1 in the second image P2, the mobile electronic device 101 moves the frame F leftward. At Step S63, as a result of changing the first image P1 projected from the projector 34 to one on the left side, a map outside the area displayed as the second image P2 is projected from the projector 34. When the user executes an operation of moving the position of the mobile electronic device 101 leftward, the map outside the area displayed as the second image P2 may also be projected from the projector 34.

It is assumed that the user has moved the mobile electronic device 101 in the direction of the projection object by the distance D1 from the state at Step S61. When detecting the operation, as illustrated at Step S64, the mobile electronic device 101 enlarges the first image P1 projected from the projector 34 more than that at Step S61 while allowing the second image P2 of the same content to be displayed. At this time, the mobile electronic device 101 changes the content of the first image P1 but does not change the position where the first image P1 is projected and its size. To represent the change of the area of the first image P1 in the second image P2, the mobile electronic device 101 reduces the frame F.

In this way, by enlarging the first image P1 according to the change of the distance between the mobile electronic device 101 and the projection object without changing the content of the second image P2, the user can check a more detailed geographical shape or the like with an intuitive operation while viewing the wide area. It is assumed that a relationship between the movement distance of the mobile electronic device 101 and the magnification factor of the first image P1 is previously determined.

When the user moves the mobile electronic device 101 in an opposite direction to the projection object from the state at Step S61, the mobile electronic device 101 reduces the first image P1 projected from the projector 34 more than that at Step S61 while allowing the second image P2 of the same content to be displayed. As a result, for example, the map of Kanto or the map of the whole of Japan is projected as the first image P1 from the projector 34.

Subsequently, it is assumed that the user has further moved the mobile electronic device 101 in the direction of the projection object by the distance D2. When detecting the operation, as illustrated at Step S65, the mobile electronic device 101 enlarges the first image P1 projected from the projector 34 more than that at Step S64 while allowing the second image P2 of the same content to be displayed. At this time also, the mobile electronic device 101 changes the content of the first image P1 but does not change the position where the first image P1 is projected and its size. To represent the change of the area of the first image P1 in the second image P2, the mobile electronic device 101 reduces the frame F.

At Step S65, as a result of excess of the magnification factor of the map over the predetermined threshold, Shibuya station as part of Shibuya Ward is stereoscopically projected from the projector 34. At Step S65, as the detailed information for the elements included in the map, the balloon B including the character string "Shibuya station" is added to the stereoscopic shape of the Shibuya station for projection.

In this way, when the change of the attitude of the mobile electronic device 101 or the change of the position thereof is detected as an operation performed for the mobile electronic device 101, the same control as that when the operation performed on the operating unit 13 is detected as the operation performed for the mobile electronic device 101 is also performed.

Subsequently, FIG. 15 will be explained below. FIG. 13 and FIG. 14 depict the examples of using the map as an image, while FIG. 15 depicts an example of using a photo as an image.

Figure 15:
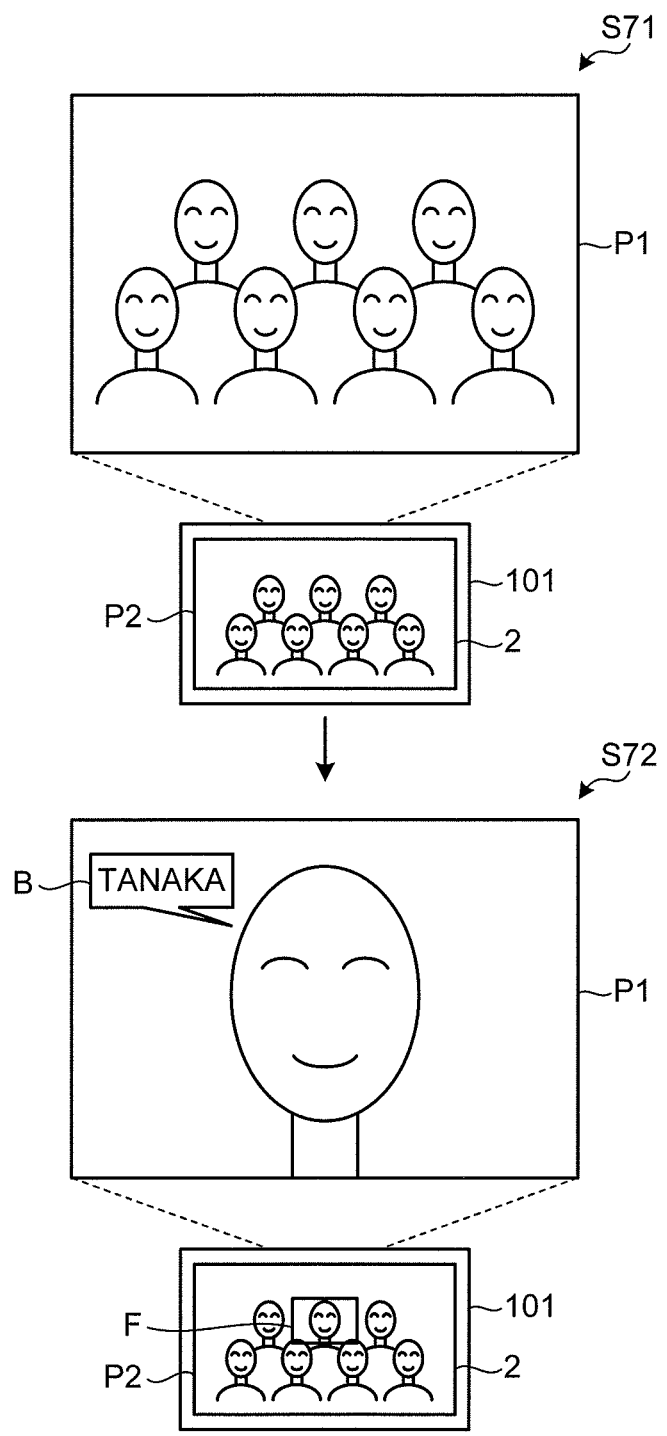
FIG. 15 is an explanatory diagram for explaining operations of the mobile electronic device.

At Step S71 illustrated in FIG. 15, the mobile electronic device 101 projects a group photo of people as the first image P1 from the projector 34. The mobile electronic device 101 displays the same group photo as the first image P1, as the second image P2 associated with the first image P1, on the display 2.

It is assumed that the user has performed a predetermined operation for enlarging the image projected from the projector 34 on the operating unit 13 or the user has moved the mobile electronic device 101 in the direction of the projection object. When detecting the operation, as illustrated at Step S72, the mobile electronic device 101 enlarges the first image P1 projected from the projector 34 more than that at Step S71 while allowing the second image P2 of the same content to be displayed. At this time also, the mobile electronic device 101 changes the content of the first image P1 but does not change the position where the first image P1 is projected and its size. To represent the position and the area of the first image P1 in the second image P2, the mobile electronic device 101 displays the frame F in the second image P2. At Step S72, as a result of excess of the magnification factor of the photo over the predetermined threshold, the mobile electronic device 101 adds the balloon B including the name of a person "Tanaka" to the enlarged person for projection, as detailed information for the element (person) included in the photo.

In this way, by performing the same control as that illustrated in FIG. 13 and FIG. 14, the user operates the mobile electronic device 101 to thereby enable to project details of any image other than the map from the projector 34 while viewing the whole through the image displayed on the display 2. FIG. 15 depicts only the example of enlarging the first image P1; however, the user operates the mobile electronic device 101 to thereby enable to slide or reduce the first image P1.

Figure 16:
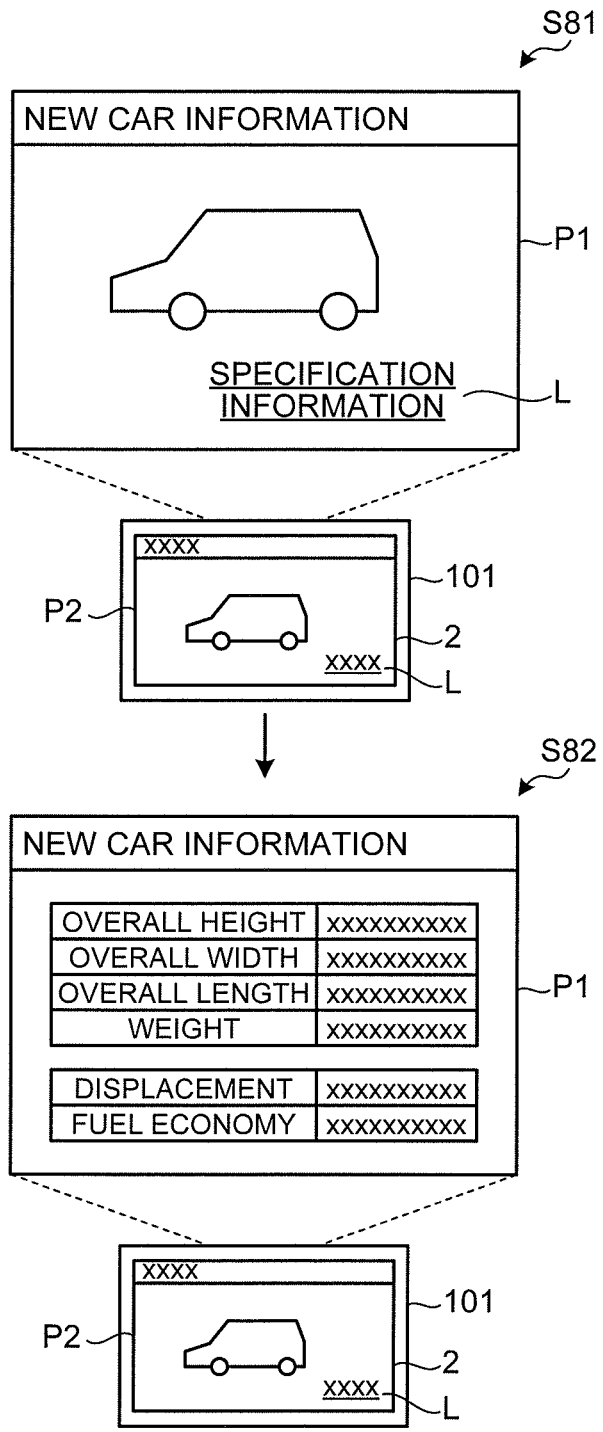
FIG. 16 is an explanatory diagram for explaining operations of the mobile electronic device.

Subsequently, FIG. 16 will be explained below. FIG. 16 depicts an example of using images related in the context as associated images.

At Step S81 illustrated in FIG. 16, the mobile electronic device 101 projects a WEB page including a photo representing the exterior of a new car as the first image P1 from the projector 34. The projected WEB page includes the link L to another WEB page displaying specification information of the new car. The mobile electronic device 101 displays the same WEB page as the first image P1 as the second image P2 associated with the first image P1 on the display 2. The WEB page is acquired through wireless communication by the communication unit 26.

It is assumed that the user has performed a predetermined operation on the operating unit 13 to select the link L. When detecting the operation, as illustrated at Step S82, the mobile electronic device 101 projects the WEB page displaying the specification information of the new car as the first image P1 projected from the projector 34 while allowing the second image P2 of the same content to be displayed.

In this way, by projecting the next screen from the projector 34 while allowing the current screen to be displayed on the display 2, the user can check the content of the next screen while viewing the current screen.

The aspects of the present invention illustrated in the embodiments can be arbitrarily modified within a scope that does not depart from the gist of the present invention. For example, the projector 34 may project an image from any side other than the opposite side of the display 2.

The embodiments are configured to project a still image from the projector 34 and display a still image on the display 2; however, either one of or both of the still images may be a moving image. For example, a TV program of a channel according to the change of the attitude of the mobile electronic device 1 may be projected from the projector 34 while allowing an electronic TV program listing to be displayed on the display 2.

The embodiments are configured so that the mobile electronic device 101 detects both the change of its attitude and the movement as operations; however, the mobile electronic device may detect either one of the change of its attitude and the movement as an operation.

The embodiments may be combined with each other as appropriate. For example, the mobile electronic device may be configured so as to switch between the operation as explained in the first embodiment and the operation as explained in the second embodiment according to the selection by the user. Alternatively, the mobile electronic device may be configured so as to switch between the operation as explained in the first embodiment and the operation as explained in the second embodiment according to the displayed and projected information. The mobile electronic device may be configured so as to switch between the operation as explained in the first embodiment and the operation as explained in the second embodiment according to the type of an operation detected.

The invention claimed is:

1. A mobile electronic device, comprising:
a projection unit for projecting an image;
a display unit for displaying an image;
a detecting unit for detecting an operation; and
a processing unit configured to
cause the projection unit to project a first image,
cause the display unit to display a second image associated with the first image, and
cause, while allowing either one of the projection unit and the display unit to perform the projecting or the displaying, the other one of the projection unit and the display unit to perform either one of projection and display according to detection of a predetermined operation by the detecting unit,
wherein
the processing unit is further configured to change, while allowing the projection unit to project the first image, the second image displayed on the display unit according to detection of the predetermined operation associated with the second image by the detecting unit,
the second image is an image obtained by enlarging a portion of the first image,
the processing unit is configured to change at least one of an area and a position of the portion according to the operation detected by the detecting unit,
the processing unit is configured to change a display mode of an element included in the second image according to a magnification factor used to display the portion as the second image, and
when the magnification factor is greater than a threshold, the processing unit is configured to add detailed information on the element included in the second image to the element for display.

2. A mobile electronic device comprising:
a projection unit for projecting an image;
a display unit for displaying an image;
a detecting unit for detecting an operation; and
a processing unit configured to
cause the projection unit to project a first image,
cause the display unit to display a second image associated with the first image, and
cause, while allowing either one of the projection unit and the display unit to perform the projecting or the displaying, the other one of the projection unit and the display unit to perform either one of projection and display according to detection of a predetermined operation by the detecting unit,
wherein
the processing unit is further configured to change, while allowing the projection unit to project the first image, the second image displayed on the display unit according to detection of the predetermined operation associated with the second image by the detecting unit,
the second image is an image obtained by enlarging a portion of the first image,
the processing unit is further configured to change at least one of an area and a position of the portion according to the operation detected by the detecting unit, and
when an amount of operation detected by the detecting unit exceeds a predetermined range, the processing unit is configured to cause the display unit to display the second image including outside of a projection area of the image projected as the first image.

3. A mobile electronic device comprising:
a projection unit for projecting an image;
a display unit for displaying an image;
a detecting unit for detecting an operation; and
a processing unit configured to
cause the projection unit to project a first image,
cause the display unit to display a second image associated with the first image, and
cause, while allowing either one of the projection unit and the display unit to perform the projecting or the displaying, the other one of the projection unit and the display unit to perform either one of projection and display according to detection of a predetermined operation by the detecting unit,
wherein
the processing unit is configured to change, while allowing the display unit to display the second image, the first image projected from the projection unit according to detection of the predetermined operation associated with the first image by the detecting unit,
the first image is an image obtained by enlarging a portion of the second image,
the processing unit is configured to change at least one of an area and a position of the portion according to the operation detected by the detecting unit,
the processing unit is configured to change a display mode of an element included in the first image according to a magnification factor used to display the portion as the first image, and
when the magnification factor is greater than a threshold, the processing unit is configured to add detailed information on the element included in the first image to the element for display.

4. A mobile electronic device comprising:
a projection unit for projecting an image;
a display unit for displaying an image;
a detecting unit for detecting an operation; and
a processing unit configured to
cause the projection unit to project a first image,
cause the display unit to display a second image associated with the first image, and cause, while allowing either one of the projection unit and the display unit to perform the projecting or the displaying, the other one of the projection unit and the display unit to perform either one of projection and display according to detection of a predetermined operation by the detecting unit, wherein the processing unit is configured to change, while allowing the display unit to display the second image, the first image projected from the projection unit according to detection of the predetermined operation associated with the first image by the detecting unit, the first image is an image obtained by enlarging a portion of the second image, the processing unit is configured to change at least one of an area and a position of the portion according to the operation detected by the detecting unit, and when an amount of operation detected by the detecting unit exceeds a predetermined range, the processing unit is configured to cause the projection unit to project the first image including outside of a display area of the image displayed on the display unit as the second image.

* * * * *